COMBINATION TELEPHONE AND INTERCOMMUNICATIONS SYSTEM

Filed Jan. 30, 1964 8 Sheets-Sheet 1

INVENTOR
R. TRUBY
BY R. C. Winter
ATTORNEY

Feb. 14, 1967 R. TRUBY 3,304,376

COMBINATION TELEPHONE AND INTERCOMMUNICATIONS SYSTEM

Filed Jan. 30, 1964 8 Sheets-Sheet 2

COMBINATION TELEPHONE AND INTERCOMMUNICATIONS SYSTEM

Filed Jan. 30, 1964

3,304,376
COMBINATION TELEPHONE AND INTERCOMMUNICATIONS SYSTEM

Ralph Truby, Rumson, N.J., assignor to Bell Telephone Laboratories, Incorporated, New York, N.Y., a corporation of New York Filed Jan. 30, 1964, Ser. No. 341,176
23 Claims. (Cl. 179—42)

My invention relates generally to telephone systems, more particularly to integrated telephone and intercommunciation systems, and specifically to telephone systems wherein local stations of an intercommunication network communicate with each other by way of individual local intercommunication channels and communicate with stations outside the intercommunication network by way of individual telephone channels connected to a telephone exchange.

Many business establishments, particularly hospitals, require communication facilities permitting intercommunication within a relatively small group of local stations as well as communication facilities permitting communication between stations of the local group and other local and nonlocal stations outside the local group. For example, hospitals generally require four basic types of communication facilities: first, facilities are provided allowing administrative and staff personnel to communicate locally among themselves and with others not physically within the hopsital; second, facilities are provided for nurses to select, signal and communicate with each patient in their charge; third, facilities are provided allowing patients to communicate locally with each other and nonlocally with others outside the hospital; and fourth, facilities are provided whereby patients can alert their nurse to their need for assistance or other attention.

The above communication requirements are usually fulfilled by three separate and distinct systems. A telephone exchange or PBX is provided to permit hospital administrators, staff and patients to communicate among themselves and with the outside world. A patient controlled nurse-call arrangement, which includes facilities for generating appropriate audible and visual signals, is provided to permit patients to alert their nurse. A nurse controlled, two-way, communication system is provided to permit a nurse selectively to signal and communicate with each patient in her charge. The installation and maintenance of three separate communication systems on a single premises to perform the above communication functions is costly and inefficient. Duplication of equipment components having similar functions in the separate systems unnecessarily increases the cost of installation as well as the cost of maintaining the separate systems. Also, little flexibility exists in the manner in which the separate systems may be cooperatively used.

Accordingly, an object of my invention is to decrease the cost of maintaining and installing communication facilities which fulfill the communications requirements of business establishments in general and of hospitals in particular.

Another object of my invention is to increase the cooperative efficiency and flexibility of communications facilities which fulfill the communications requirements of business establishments in general and of hospitals in particular.

Prior art local intercommunication arrangements are of two general types. As utilized in hospitals for nurse-patient communication, these arrangements generally comprise either a two-way loudspeaker system or a key telephone system. The loudspeaker type system permits a nurse to select a patient station, to signal the selected station and to converse with the patient over a loudspeaker loacted in the patient's room. This type of arrangement is adavntageous in that no manual act by the patient is necessary for the patient to converse with the nurse, i.e., hands-free patient operation is provided. However, in the loudspeaker type arrangement, a nurse-patient conversation is not private as it is broadcast over the loudspeaker so that all in the patient's room can hear. A key telephone system permits a nurse to select and signal a patient station and to converse with the patient after the handset of the patient station has been lifted and placed in a position suitable for the patient's use. The key telephone arrangement affords the conversational privacy which was lacking in the loudspeaker type system, but it does not have the hands-free patient operation advantage of the loudspeaker arrangement. If a patient is physically incapacitated or is otherwise occupied, it may be physically impossible or highly inconvenient for him to perform the manual act of lifting his handset to answer the nurse's signal.

Accordingly a further object of my invention is to permit the selective use of local intercommunication facilities on either a hands-free basis or a manual basis in accordance with the immediate physical capacity and privacy requirements of each individual station user.

The above and other objects of my invention are attained in one illustrative embodiment thereof which is described herein, by way of example, in terms of its use in a hospital. Each patient station terminates an individual intercommunication channel in a microphone and loudspeaker arrangement incorporated in the patient station. Each patient station also terminates a telephone channel associated with the telephone handset of the patient station. The respective patient telephone channels are normally connected to a telephone exchange and are used for regular telephone calls to and from the respective patients. Each patient station is equipped with a signaling key or keys which, when actuated by a patient, initiate the generation of appropriate audible and visual nurse-call signals to alert the nurse.

Each nurse station is intercommunicatively associated with one group of patient stations comprising the stations of patients in the nurse's charge. A nurse station is equipped with an intercommunication channel and with one or more telephone channels. The telephone channels are connected directly to the telephone exchange and are used for regular telephone calls to and from the nurse station.

The nurse station is further equipped with a discrete patient station selection key for each patient station in the intercommunication network. By operating a station selection key, the nurse effects the establishment of a connection between the nurse station intercommunication channel and the intercommunication channel of the patient station defined by the operated station selection key. The nurse can then converse through her handset or speakerphone with the selected patient via the connected intercommunication channels and the loudspeaker-microphone arrangement at the selected patient station. No physical act is required of the patient at the selected patient station to answer the nurse's call, and hands-free patient operation is thus provided.

In accordance with an aspect of my invention, the patient can, at his discretion, initiate a transfer of the nurse-patient conversation from his intercommunication channel to his telephone channel, thereby permitting a more private nurse-patient conversation. The transfer is initiated merely by lifting the patient station handset and thus operating the switchhook contact of the patient station. When a patient and his nurse are conversing over their connected intercommunication channels, the operation of the patient station switchhook contact automatically initiates the disconnection of the patient station telephone channel from the telephone exchange, the disconnection of the patient station intercommunication channel from the nurse station intercommunication channel and the connection of the patient station telephone channel to the nurse station intercommunication channel. Thus each patient, at his own discretion, can select either his relatively public, hands-free, intercommunication channel or his relatively private, telephone channel for conversing with the nurse.

A nurse station is equipped with means for transferring audible nurse-call signals to a remote location. Means are provided whereby a station located at the remote location may be automatically connected to the intercommunication channel of a calling patient station when the handset of the remote station is lifted. Thus, when a nurse station is left unattended, calls from the various patients to their nurse can be answered at the remote station.

In accordance with a feature of my invention, communications facilities which fulfill both internal and external signaling and communication requirements of business establishments in general and of hospitals in particular are incorporated into a single communication system.

In accordance with another feature of my invention, stations within an intercommunication network comprise apparatus permitting selective intercommunication either hands-free or under manual control at the discretion of each station user.

In accordance with a more specific feature of my invention, stations within an intercommunication network are individually equipped to manually control a corresponding telephone channel normally connected to a telephone exchange and to permit hands-free intercommunication via another channel connected to the intercommunication network; the manually controlled telephone channel being automatically transferrable from the telephone exchange to the intercommunication network responsive to operation of the switchhook contact of the station.

The above and other objects and features of my invention will be more fully understood from the following description when read with reference to the drawing wherein.

Figure 3:
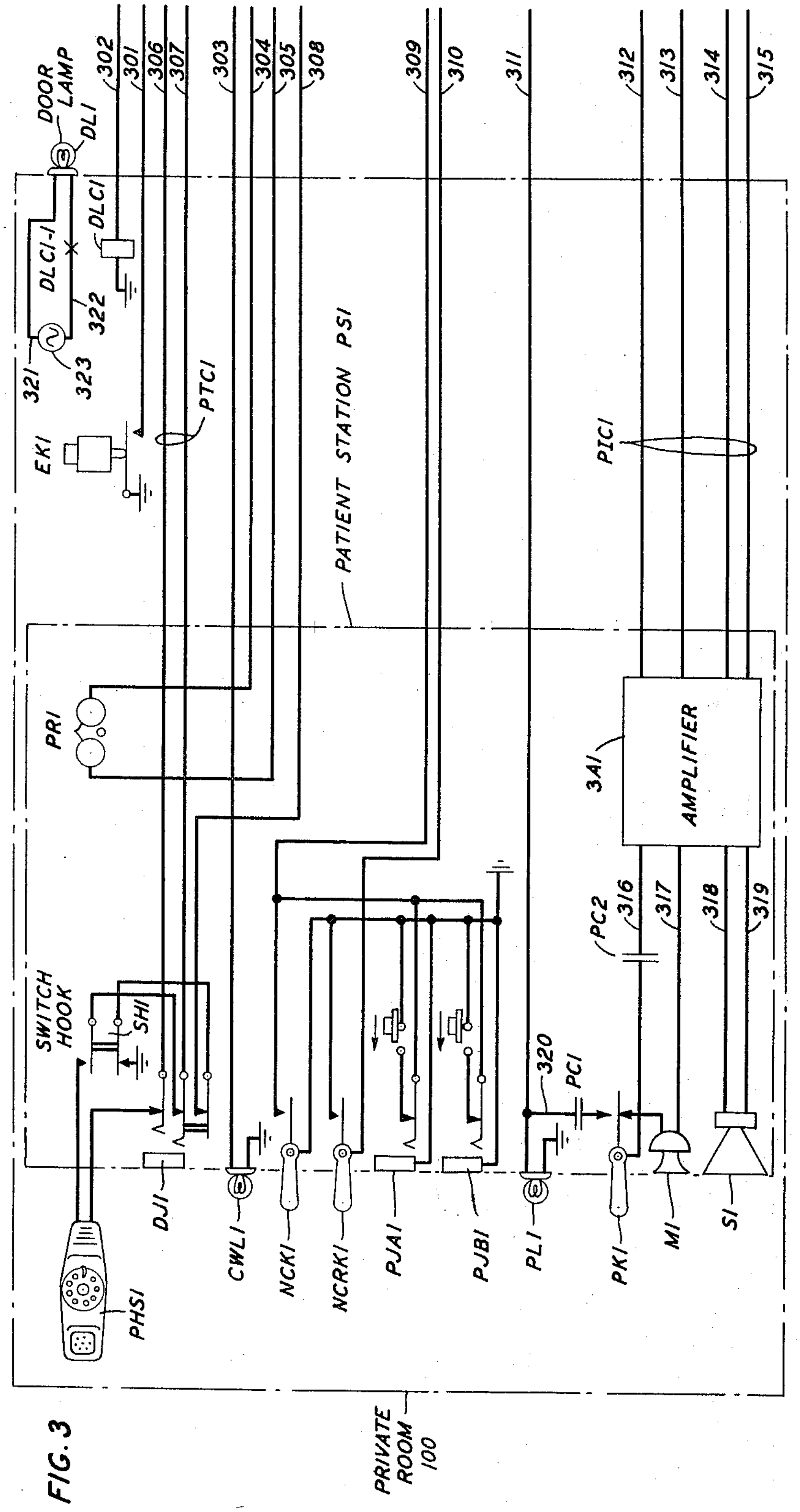
FIGS. 3 and 6 show, in schematic form, the patient stations of the system.
Figure 4:
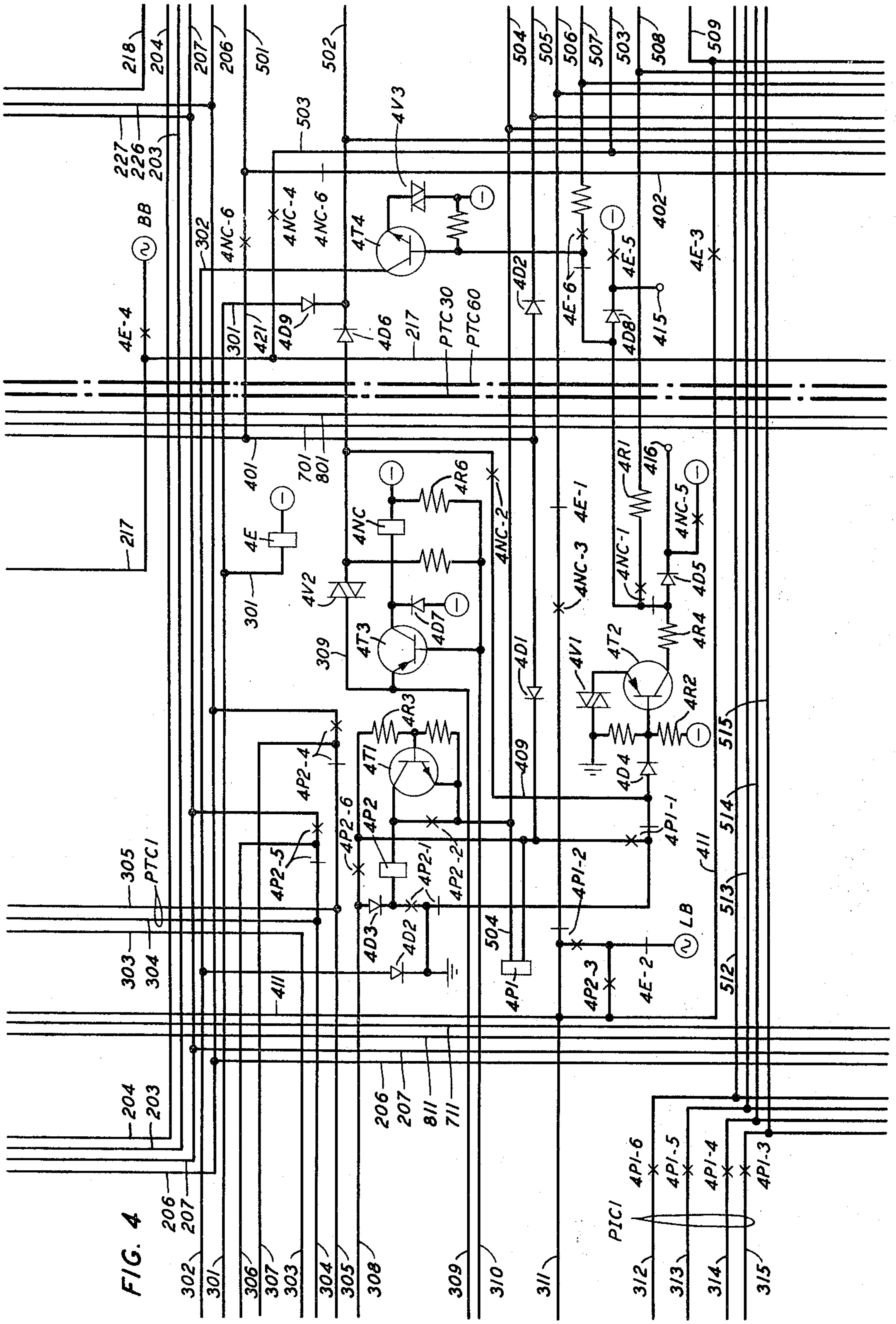
Figure 5:
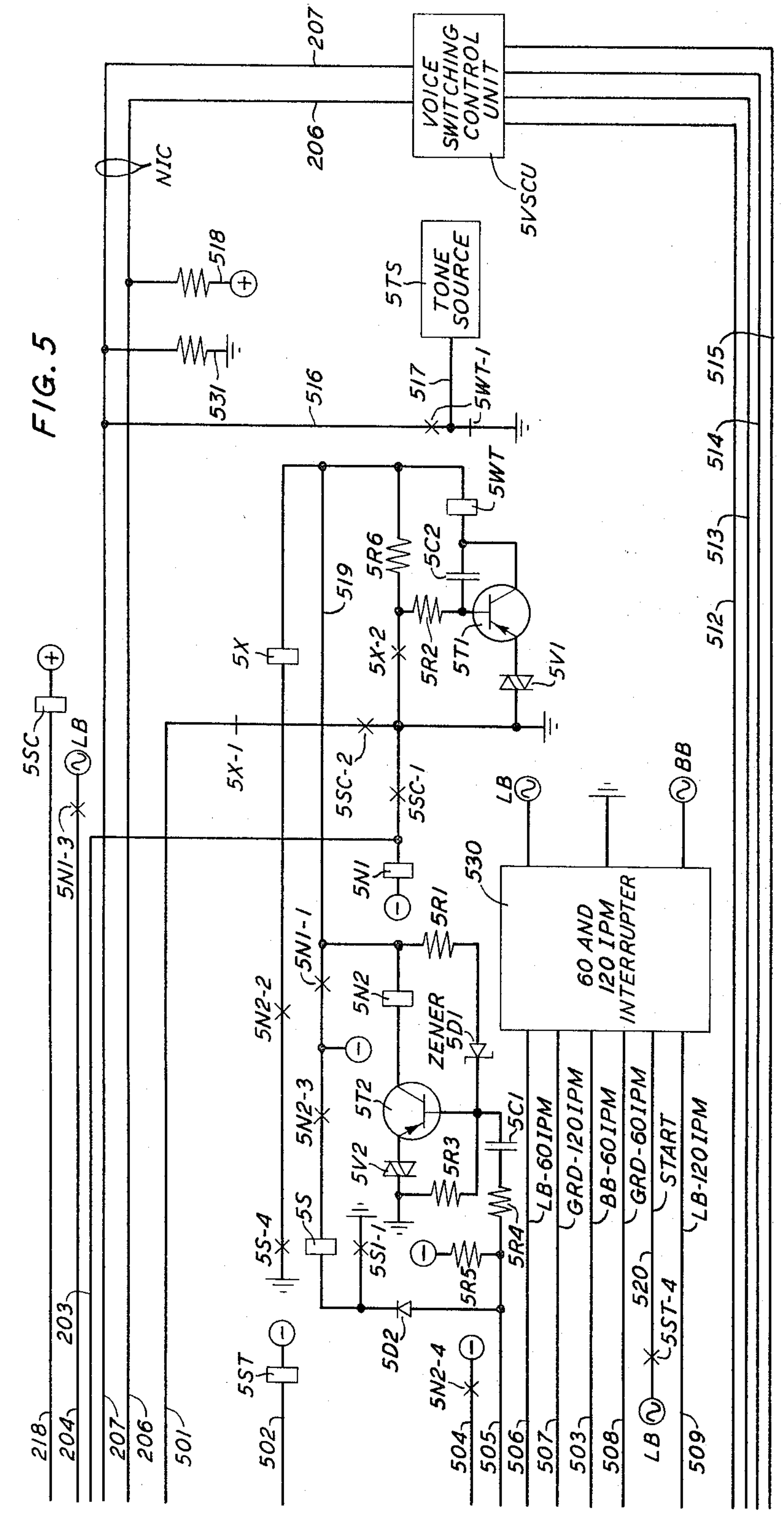
Figure 6:
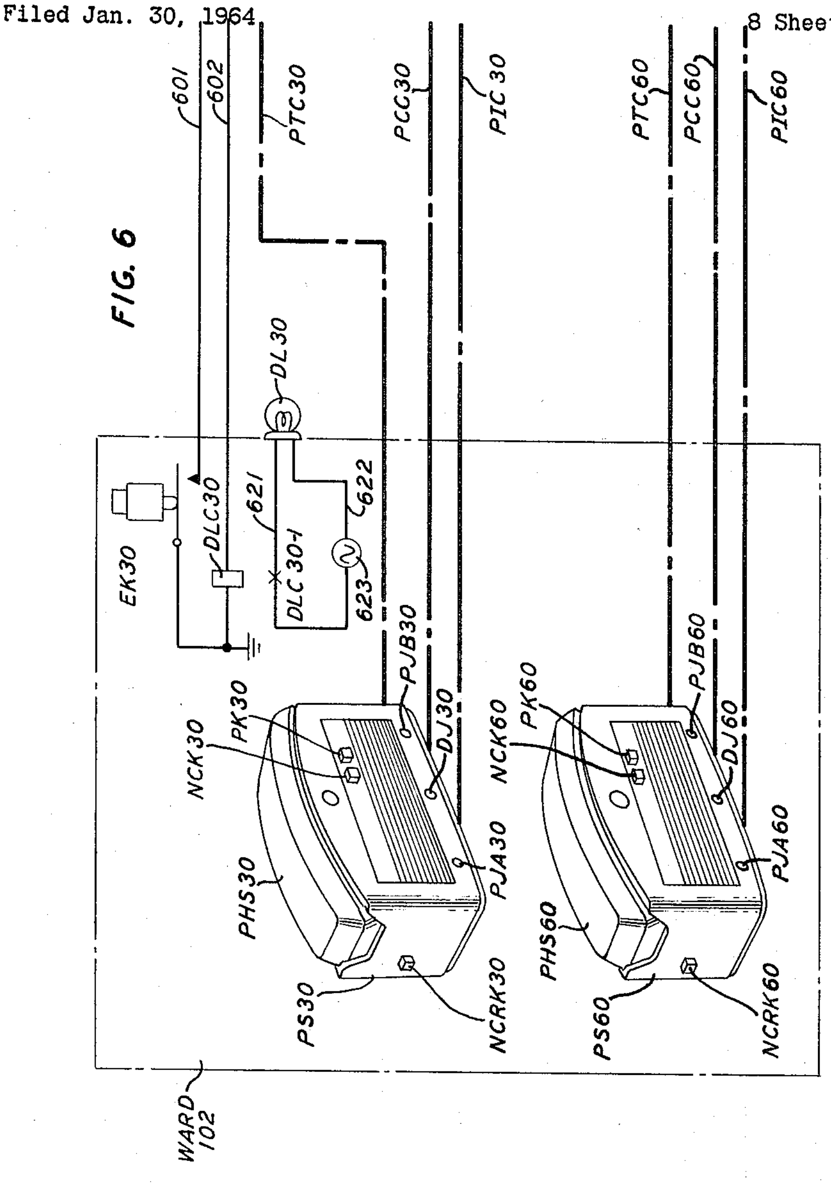
Figure 9:
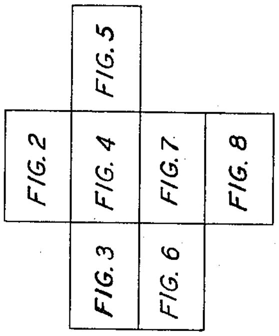
Figure 7:
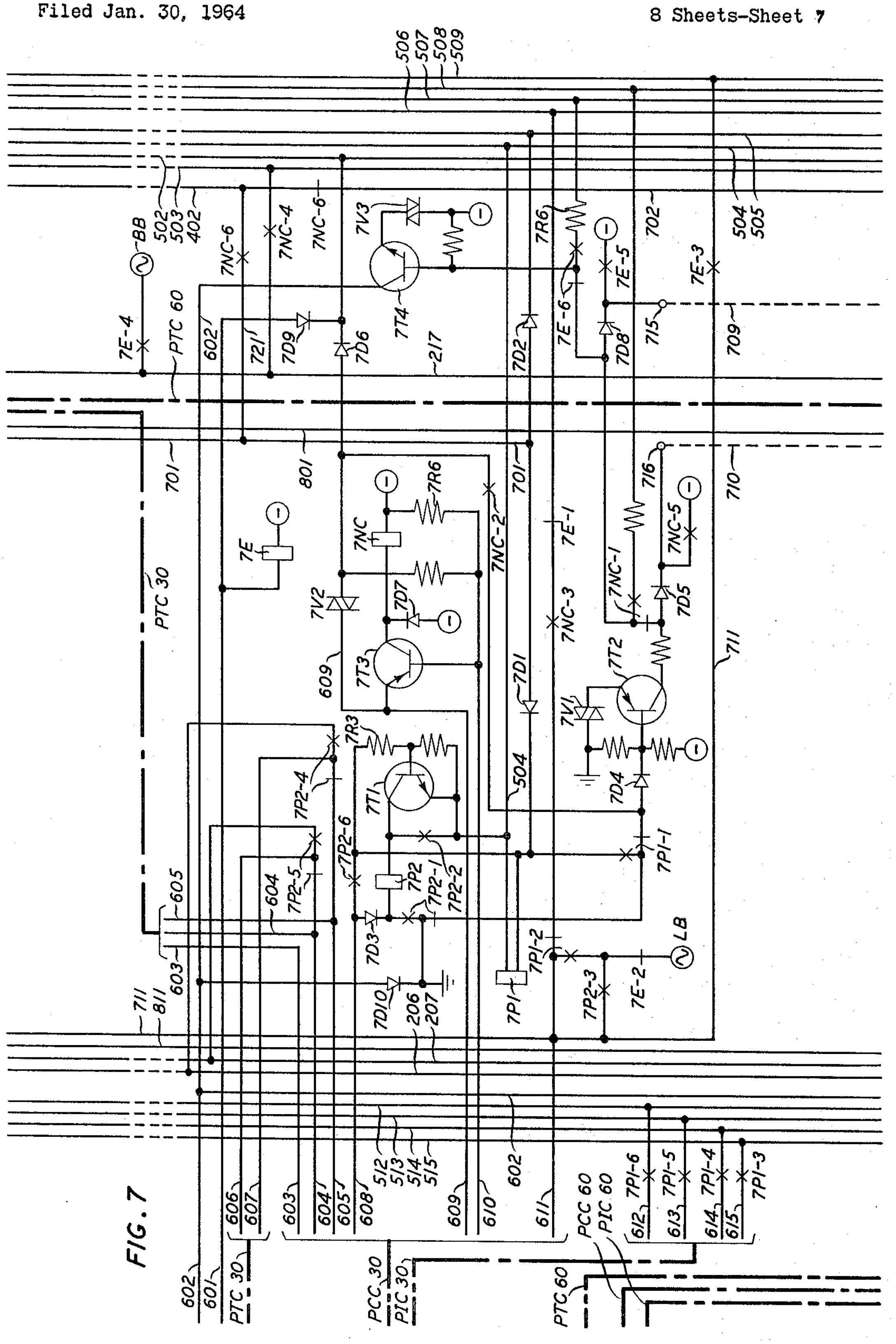
Figure 8:
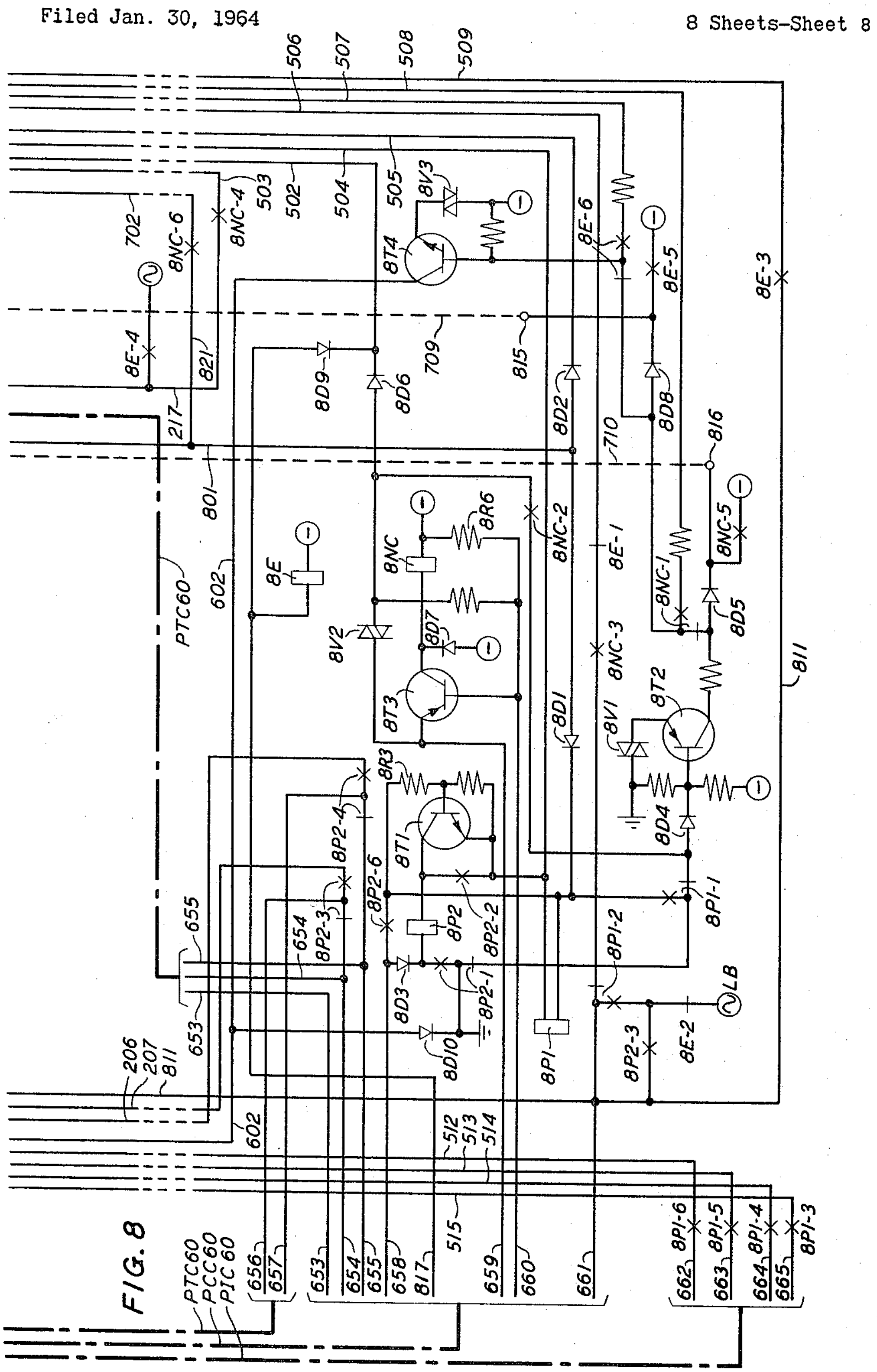

FIGS. 4, 7 and 8 respectively show, in schematic form, the patient station control circuits associated with the patient stations of FIGS. 3 and 6;

FIG. 5 shows, in schematic form, the nurse station control circuit and other common intercommunication control equipment; and FIG. 9 indicates the manner in which FIGS. 2–8 are arranged.

The detached contact method of illustration has been adopted in the drawing. In this method, a relay winding is shown physically separated from the relay contacts controlled thereby. This permits placement of the relay contacts at locations in the circuit drawing at which the functions performed thereby are visually pertinent, and avoids the necessity of employing a large number of unnecessarily long connecting lines. In this method of illustration, break contacts, i.e. those contacts of a relay which are closed when the relay is released and open when the relay is operated, are illustrated by a short line perpendicular to the conductor to which they are connected, for example break contact 5X–1 on FIG. 5. Make contacts, i.e. those contacts of a relay which are open when the relay is released and closed when the relay is operated, are illustrated by a pair of diagonal lines forming an "X" which intersect the conductor to which they are connected, for example make contact 5S–4 on FIG. 5.

Relay contacts are identified by a designation corresponding to that of the relay winding by which they are controlled. For example, make contact 5N–1 connected to lead 519 and make contact 5N1–3 connected to lead 204 on FIG. 5 are controlled by the correspondingly designated relay 5N1 on FIG. 5. In addition to the relay designation, the contacts controlled thereby are numerically designated with an additional digit. For example, make contact 5N1–1 is one relay contact controlled by relay 5N1 and make contact 5N1–3 is another relay contact controlled by relay 5N1. Where a make and a break contact are identically designated, for example make and break contacts 5WT–1 on FIG. 5, they represent transfer contacts.

Relays, leads, cables and other circuit elements are designated so as to indicate the number of the drawing figure on which they appear or from which they originate. For example, the initial digit 5 of the relay designation 5N1 indicates that relay 5N1 and the relay contacts thereof are shown in FIG. 5. Similarly, the initial digit 5 of the lead designation 503 indicates that lead 503 may be considered as originating on FIG. 5. Where possible, circuit elements and equipment items have been given functional designations, and the designation of corresponding circuit elements is consistent throughout the drawing to facilitate interpretation of the drawing.

GENERAL DESCRIPTION

*System arrangement (FIG. 1)*

Figure 1:
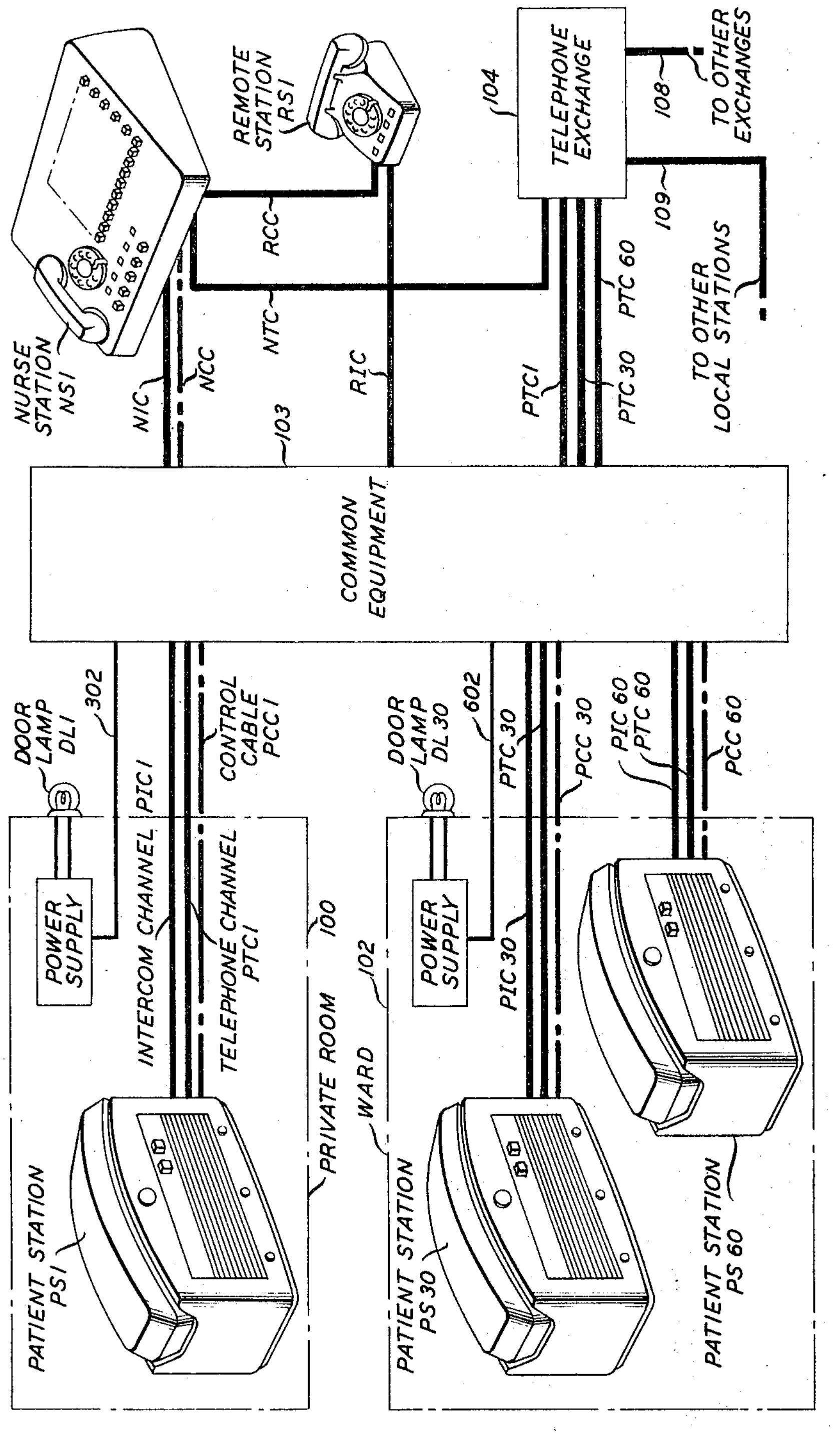
FIG. 1 shows, in block diagram form, a communication system illustrative of my invention as it may be installed in a hospital.

FIG. 1 illustrates one manner in which my invention may be installed for use in a hospital. A nurse station NS1 is intercommunicatively associated with a plurality of patient stations PS1–PS60, of which patient stations PS1, PS30 and PS60 are shown, to form an intercommunication network. Common equipment 103 is provided to perform the necessary switching operations for selectively connecting nurse station NS1 with patient stations PS1–PS60. Remote station RS1 is provided for answering patient-to-nurse calls when nurse staion NS1 is unattended. All of the stations NS1 and PS1–PS60 are given access to telephone exchange 104, whereby outside calls may be made to and from other telephone stations inside or outside the hospital.

Telephone exchange 104 may comprise any well-known type of manual or automatic telephone switching center. It provides facilities for selectively interconnecting the various hospital stations connected thereto and for selectively connecting hospital stations with outside stations and with trunk circutis to distant telephone exchanges. If a sufficient number of hospital stations are required, telephone exchange 104 may be a PBX physically located within the hospital plant or, if a relatively small number of hospital stations are required, telephone exchange 104 may be a telephone central office located outside the hospital plant which serves other telephone stations in addition to the hospital stations.

Among the various hospital stations connected to telephone exchange 104 are nurse stations, such as NS1, patient stations, such as PS1, PS30 and PS60, and other stations (not shown) used by hospital administrative and staff personnel. Where hospital stations are equipped with more than one telephone channel, telephone exchange 104 may include the key telephone control equipment necessary for the selective use of multiple lines by a single station. Since such telephone exchanges and the components thereof are well known in the telephone art and since further details thereof are not necessary for an understanding of my invention, no detailed description of telephone exchange 104 is included herein.

Each patient station PS1–PS60 is connected to common equipment 103 through a control cable PCC1–

PCC60. The control cables PCC1–PCC60 include various leads over which control signals are transmitted between the respective patient staions PS1–PS60 and common equipment 103. A similar control cable NCC connects nurse station NS1 with common equipment 103.

Each patient station PS1–PS60 is connected to common equipment 103 by a patient intercommunication channel PIC1–PIC60. Nurse station NS1 is connected to common equipment 103 by a nurse intercommunication channel NIC. In response to station selection signals generated at nurse station NS1, common equipment 103 effects connections between nurse intercommunication channel NIC and a selected patient intercommunication channel PIC1–PIC60.

Remote intercommunication channel RIC connects remote station RS1 to common equipment 103 to facilitate answering of patient-to-nurse calls at remote station RS1. Common equipment 103 automatically connects remote intercommunication channel RIC to the patient intercommunication channel PIC1–PIC60 of a calling patient station PS1–PS60.

Each patient station PS1–PS60 is connected through common equipment 103 to telephone exchange 104 by a patient telephone channel PTC1–PTC60. Patient telephone channels PTC1–PTC60 are used for outside telephone calls to and from patient stations PS1–PS60. Means are provided in common equipment 103 to transfer patient-nurse conversations from a patient intercommunication channel PIC1–PIC60 to the corresponding patient telephone channel PTC1–PTC60 and to disconnect telephone exchange 104 from the appropriate patient telephone channel PTC1–PTC60.

Nurse station NS1 is connected to telephone exchange 104 by one or more nurse telephone channels NTC. Calls to and from stations outside the intercommunication network are originated or answered at nurse station NS1 by way of the nurse telephone channels NTC and telephone exchange 104.

*System equipment (FIGS. 2–8)*

PATIENT STATIONS PS1–PS60 (FIGS. 3 AND 6)

Patient stations, such as PS1, may be provided on an individual patient basis or may be shared by a plurality of patients in the same room. The patient in private room 100 signals his nurse by operating his nurse-call key NCK1 or by operating a pendant button (not shown) on a cord for which pendant cord jacks PJA1 and PJB1 are provided at patient station PS1. The momentary operation of either the nurse-call key NCK1 or the pendant button (not shown) signals common equipment 103 to initiate a plurality of 60 i.p.m. nurse-call signals, both audible and visual. These 60 i.p.m. nurse-call signals indicate that a particular patient requests attention. Among the visual nurse-call signals are a flashing door lamp DL1 located outside the door of the calling patient's room 100, a flashing patient lamp PL1 incorporated in the individual patient station PS1 and a flashing station lamp SL1 located at the nurse station NS1 of FIG. 2. Nurse-call signals originated from patient stations in a multipatients ward 102, such as stations PS30 and PS60, are indicated by the single door lamp DL30 outside the door of the ward 102 in which the calling patient is located. Audible nurse-call signals are indicated by a buzzer NB1 at the nurse station NS1 of FIG. 2.

The patient at station PS1 may cancel his request for assistance and retire the 60 i.p.m. audible and visual nurse-call signals by operating the nurse-call release key NCRK1 on his station PS1.

When a nurse answers the patient's nurse-call signal at the nurse station NS1, a short burst of audible tone is heard over speaker S1 at patient station PS1. This tone indicates to the patient that the nurse is connected to his intercommunication channel PIC1 and that she can hear any conversation in his room by way of microphone M1. Following the short burst of audible tone, the nurse and patient may converse over microphone M1 and speaker S1 incorporated in patient station PS1. If the patient desires a more private conversation with his nurse, he merely lifts the telephone handset PHS1 of his station PS1. The nurse-patient conversation is then automatically transferred from the microphone M1 and speaker S1 to the patient station handset PHS1.

The patient station handset PHS1 is also used by the patient to originate and answer regular telephone calls by way of telephone exchange 104. Each patient station, such as PS1, is equipped with a ringer PR1 which generates audible signals in response to ringing current transmitted from telephone exchange 104 to indicate an incoming call. Handset PHS1 is similar to that described in C. F. Mattke Patent 3,073,911, issued January 15, 1963. It includes a dial for generating call information signals to which telephone exchange 104 responds. The telephone handset PHS1 and the microphone M1 and speaker S1 may be used concurrently for a regular telephone call and for a nurse-patient conversation. However, should the patient desire a private conversation with his nurse, he must terminate the regular telephone call before the nurse-patient conversation can be transferred to the telephone handset PHS1.

If a patient desires complete privacy, he may operate the privacy key PK1 on his station PS1. In an operated condition, key PK1 opens the circuit of microphone M1 so that the nurse cannot eavesdrop on conversations in the patient's room. Operation of key PK1 also applies an audible tone to the circuit of microphone M1. This tone alerts the nurse that the patient does not wish to be disturbed. However, the patient cannot disable his speaker S1, and the nurse can talk to him at any time.

An emergency key EK1 is provided at a strategic location or locations associated with the individual patient. Operation of emergency key EK1 causes common equipemnt 103 to initiate various audible and visual emergecy signals different from the normal nurse-call signals. The emergency signals initiated as a result of an operated emergency key EK1 cannot be retired unless emergency key EK1 is manually released. This necessitates the physical presence of the nurse at the location of emergency key EK1 or the release of emergency key EK1 by the patient.

Each patient station, such as PS1, is equipped with a data jack DJ1. Data jack DJ1 provides access to telephone exchange 104 over telephone channel PTC1 whereby diagnostic data, such as electrocardiogram signals, may be transmitted to a selected location within the hospital for analysis.

Each patient station, such as PS1, is equipped with a call-waiting lamp CWL1 whereby the patient may be notified that an incoming telephone call from telephone exchange 104 is awaiting his answer. Lamp CWL1 may be advantageously used when telephone exchange 104 is manually controlled. It is lighted under the control of an operator at the switchboard of telephone exchange 104 to indicate an unanswered waiting call or a message to be delivered to the patient.

NURSE STATION NS1 (FIG. 2)

Nurse stations, such as NS1, are provided at central locations throughout the hospital which are physically near the patients under the charge of the respective nurses. In the illustrative system described herein, nurse station NS1 is equipped for intercommunicative association with a network comprising a maximum of sixty patient stations PS1–PS60. However, the number of patient stations associated with a nurse station is flexible and may be easily varied by simple equipment additions.

A nurse station NS1 is equipped with one or more telephone channels, such as NTC1, which are directly connected to telephone exchange 104. If more than one telephone channel NTC1 is provided, telephone exchange 104 may include key telephone equipment permitting flexible, selective use of the various telephone channels, as is well known in the art. Telephone channels, such as NTC1, are selected for use by the nurse by operating an appropriate line pick-up key, such as LPK1, on her station NS1.

A nurse calls a selected patient station, for example PS1, by operating the intercommunication pick-up key IPK1, lifting the nurse station handset NHS1 and then operating the station selection key SSK1 discretely defining the selected patient station PS1. When key IPK1 is operated and handset NHS1 is raised, a tone is transmitted to the nurse's handset NHS1 indicating to the nurse that the nurse station NS1 is connected to the intercommunication network. When station selection key SSK1 is subsequently operated, the tone is momentarily transmitted to the selected patient station PS1, indicating to the patient that the nurse is conneced to his intercommunication channel PIC1. The tone is then cut off from the nurse's handset NHS1 and the patient station PS1, and the nurse can converse with the selected patient through the nurse station handset NHS1. If desired, nurse station NS1 may be equipped with a speakerphone arrangement (not shown) similar to that described in W. F. Clemency Patent 3,075,045, issued January 22, 1963, to provide the nurse with hands-free operation.

Each station selection key SSK1–SSK60 has a discrete station lamp SL1–SL60 associated therewith which flashes at 60 i.p.m. when the patient at the station PS1 defined by the station selection key SSK1, has operated his nurse call key NCK1. To answer a patient-to-nurse-call signal, the nurse operates the station selection key SSK1–SSK60 associated with the flashing lamp SL1–SL60. The lamp SL1–SL60 then ceases to flash and remains continuously lighted until the nurse releases the nurse-patient connection. A nurse-patient connection can be released either by replacing handset NHS1, by releasing key IPK1 or by depressing another station selection key SSK1–SSK60.

Nurse station NS1 is equipped with a ringer NR1 to indicate incoming telephone calls from telephone exchange 104 and a buzzer NB1 to indicate calls from patient stations PS1–PS60. Emergency signals from patient stations PS1–PS60 are indicated at nurse station NS1 when the station lamp SL1–SL60 defining the calling patient station PS1–PS60 flashes at 120 i.p.m. and buzzer NB1 is continuously sounded.

Nurse station NS1 is further equipped with a remote station transfer key RTK1. When key RTK1 is operated, nurse-call and emergency audible signals from patient stations PS1–PS60 are transmitted to another station RS1 remote from nurse station NS1.

REMOTE STATION RS1 (FIG. 2)

Since it is possible that nurse station NS1 may be unattended at times, a remote station RS1 is provided from which patient-to-nurse calls can be answered. Remote station RS1 may be located centrally with other remote stations associated with different nurse stations, or it may be at some normally attended location in the immediate vicinity of the patients in the charge of the nurse at nurse's station NS1.

When transfer key RTK1 at nurse's station NS1 is operated, patient-to-nurse-call signals are transmitted to remote station RS1. A patient-to-nurse call is answered at remote station RS1 merely by lifting the handset RHS1. Common equipment 103 then automatically connects remote station RS1 to the calling patient station PS1–PS60. If more than one patient station PS1–PS60 is calling the nurse, the connection is made through a preference lock-out circuit in common equipment 103 which permits connection of remote station RS1 to only one patient station PS1–PS60 at a time.

*Common equipment 103 (FIGS. 4, 5, 7 and 8)*

Each patient station PS1–PS60 is connected to an individual patient station control circuit in common equipment 103. FIG. 4 schematically illustrates the patient station control circuit for patient station PS1 of FIG. 3. FIGS. 7 and 8 respectively illustrate the patient station control circuits for patient stations PS30 and PS60 of FIG. 6. A patient station control circuit, for example FIG. 4, provides controllable switching whereby nurse-patient conversations may be transferred from a patient station microphone M1 and speaker S1 to the patient station handset PHS1. A patient station control circuit also includes circuitry which responds to patient-to-nurse-call signals and emergency signals from the associated patient station PS1 to initiate the appropriate audible and visual signals for alerting the nurse.

FIG. 5 schematically illustrates the control circuitry for nurse station NS1 and other equipment common to the intercommunication network. A central voice-switching control unit 5VSCU is included in the common equipment 103. Control unit 5VSCU facilitates connection of the bidirectional nurse intercommunication channel NIC to the unidirectional microphone M1 and the unidirectional speaker S1 of a selected patient station PS1. Copending patent application of W. F. Clemency et al., Serial No. 60,476, filed October 4, 1960, describes such a voice-switching circuit. Sincet he detailed operation of control unit 5VSCU is not necessary for an understanding of my invention, no detailed description thereof is included herein.

Common equipment 103 also includes a tone source 5TS. Tone source 5TS generates the aforenoted audible signal which is transmitted to the nurse station handset NHS1 and to a patient station speaker S1 when patient station PS1 is selected by the nurse at nurse station NS1. Since such tone sources are well known in the art and details thereof are not necessary for an understanding of my invention, no further description of tone source 5TS is included herein.

Interrupter circuit 530 of common equipment 103 transmits the various control potentials interrupted at appropriate intervals to control the audible and visual signaling devices indicating nurse-call and emergency signals from a patient. Interrupter circuits providing interrupted control potentials are well known in the telephone art and the details thereof are not necessary to an understanding of my invention. No detailed description of interrupter 530 is included hereinbelow.

Common equipment 103 also includes a power supply (not shown) which supplies the potentials for the intercommunication network. The potentials supplied by the power supply include negative potential and ground potential for controlling the operation of the relays and transistors of the station control circuits, alternating potential LB for lighting the various lamps at nurse station NS1 and patient stations PS1–PS60 and alternating potential BB for activating buzzer NB1 at nurse station NS1 and buzzer RB1 at remote station RS1. Power supplies of the type required to supply the aforenoted potentials are well known in the art and no description thereof is given herein.

DETAILED DESCRIPTION

*Patient-to-nurse call*

PATIENT-TO-NURSE CALL SIGNALING

Each patient station, for example patient station PS1 on FIG. 3, is equipped with a nurse-call key NCK1 which the patient operates to call his nurse. Each patient station is further equipped with jacks such as PJA1 and PJB1 into which pendant button cords (not shown) may be inserted for use by patients who are physically unable to reach the nurse-call key NCK1. When key NCK1 or a pendant button is momentarily operated by the patient, various audible and visual nurse-call signals are initiated to alert the nurse.

The operation of key NCK1 or of a pendant button (not shown) applies ground potential through the operated key NCK1 or button to lead 309. The emitter of transistor 4T3 on FIG. 4 is connected to lead 309. The base of transistor 4T3 is connected through resistor 4R6 to negative potential. Thus, the application of ground potential to lead 309 forward biases the emitter-base junction of transistor 4T3 causing transistor 4T3 to be turned ON.

When transistor 4T3 is turned ON, a circuit for operating relay 4NC is completed. This operating circuit extends from negative potential through the winding of relay 4NC and transistor 4T3 to the ground potential on lead 309. Relay 4NC is operated over this circuit, and locks operated over a circuit extending from negative potential through its winding, transistor 4T3, varistor 4V2, and make contact 4NC–2, over lead 409 and through break contacts 4P1–1 and 4P2–1 to ground potential.

The operation of relay 4NC completes an operating circuit for start relay 5ST. Relay 5ST operates over a circuit extending from negative potential through its winding, over lead 502, through diode 4D6 and make contact 4NC–2, over lead 409, and through break contacts 4P1–1 and 4P2–1 to ground potential. The operation of relay 5ST completes a circuit for activating interrupter 530, which extends from alternating potential LB through make contact 5ST–4 and over start lead 520 to interrupter 530.

The respective outputs of interrupter 530 as indicated on FIG. 5 are applied to leads 503, 506, 507, 508 and 509. The outputs consist of ground potential, alternating potential LB and alternating potential BB each interrupted either sixty or one hundred twenty times each minute.

Lead 508 has ground potential applied thereto interrupted sixty times per minute (60 i.p.m.). This 60 i.p.m. ground potential is applied over lead 508 through resistor 4R1, make contact 4NC–1, and break contact 4E–6 to the base element of transistor 4T4. The emitter of transistor 4T4 is connected through varistor 4V3 to negative potential. Thus, the application of ground potential to the base of transistor 4T4 forward biases the base-emitter junction thereof and causes transistor 4T4 to be turned ON.

When transistor 4T4 is turned ON, a circuit for operating door lamp control relay DLC1 on FIG. 3 is completed. This circuit extends from negative potential through varistor 4V3 and transistor 4T4, over lead 302 and through the winding of relay DLC1 to ground potential. When relay DLC1 is operated, the door lamp DL1 of room 100 is lighted over a circuit including make contact DLC1–1. Thus, a transistor 4T4 is turned OFF and ON in response to the 60 i.p.m. ground potential applied to its base, the door lamp DL1 flashes at 60 i.p.m. to indicate visually the origination of a patient-to-nurse call.

Lead 506 has alternating potential LB applied thereto interrupted sixty times each minute by interrupter 530. This 60 i.p.m. alternating potential LB is applied over lead 506 through break contact 4E–1, make contact 4NC–3, and break contact 4P1–2 to leads 411 and 311. Lead 311 is connected to patient lamp PL1 at patient station PS1. Lamp PL1 flashes on and off sixty times a minute responsive to the application thereto of 60 i.p.m. alternating potential LB. The flashing patient lamp PL1 visually indicates to the patient that the nurse has been signaled.

Figure 2:
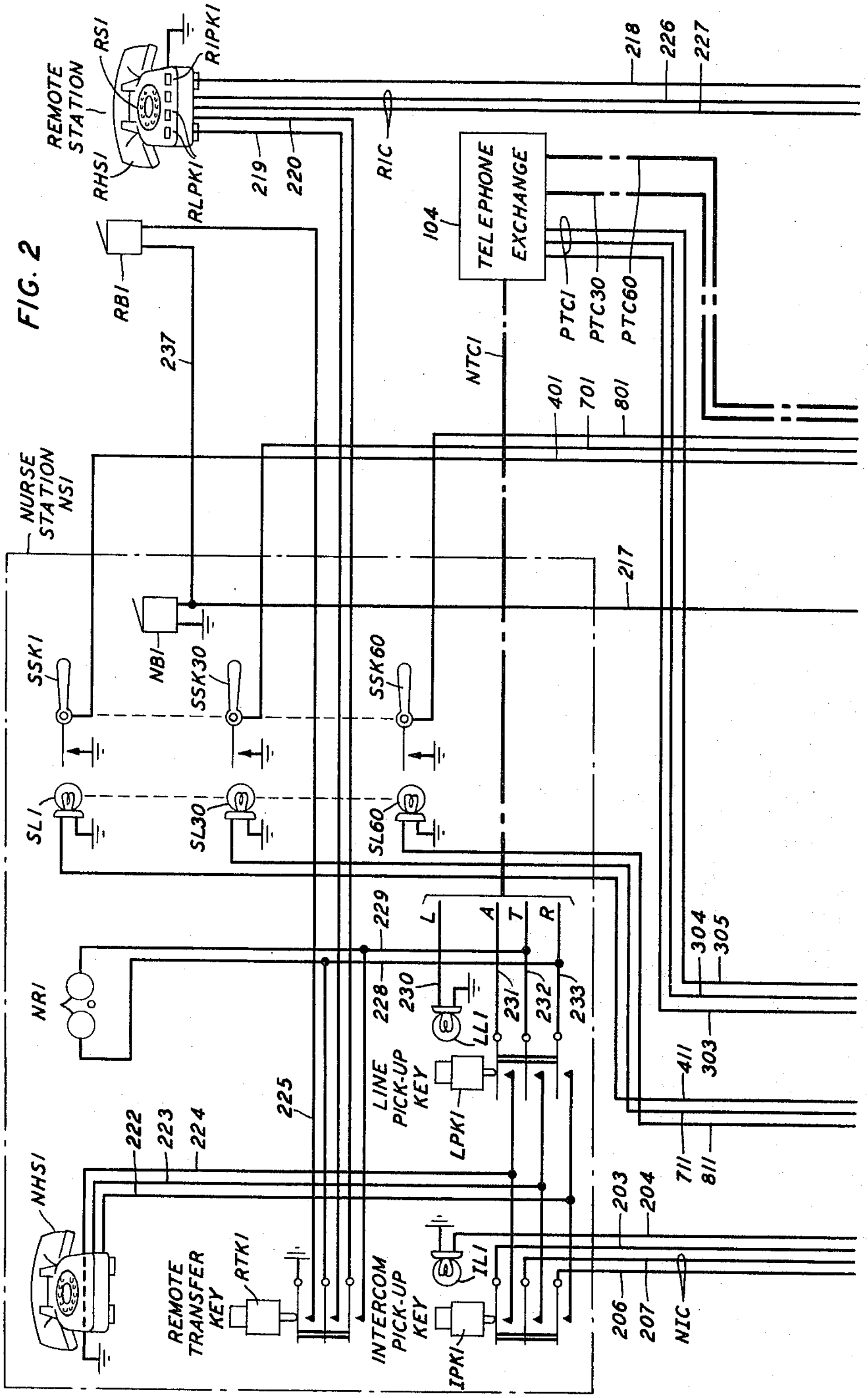
FIG. 2 shows a nurse station, a remote station and a telephone exchange; the nurse station being illustrated schematically, and the remote station and telephone exchange being represented in block diagram form.

Lead 411 is connected to station lamp SL1 at nurse station NS1 shown in FIG. 2. Station lamp SL1 is discretely associated with patient station PS1. Lamp SL1 flashes on and off responsive to the application thereto of the 60 i.p.m. alternating potential LB over lead 411. The 60 i.p.m. flashing of station lamp SL1 visually indicates to the nurse that the patient at patient station PS1 has initiated a patient-to-nurse call.

Lead 503 has alternating potential BB applied thereto interrupted sixty times each minute by interrupter 530. This 60 i.p.m. alternating potential BB is applied over lead 503 through make contact 4NC–4 to lead 217. Lead 217 is connected to buzzer NB1 at nurse station NS1 on FIG. 2. Buzzer NB1 generates a 60 i.p.m. audible signal responsive to the 60 i.p.m. alternating potential BB applied thereto. This 60 i.p.m. signal audibly indicates to the nurse that one of her patients has initiated a patient-to-nurse call.

REMOTE STATION SIGNALING

The nurse station NS1 of FIG. 2 is equipped with a remote station transfer key RTK1 which, when operated, connects the remote station RS1 to the signaling and talking conductors of the system. Key RTK1 is a locking key, i.e. when operated it remains operated until manually released. If key RTK1 is operated, ground potential is supplied to remote buzzer RB1 over lead 225, and buzzer RB1 provides a 60 i.p.m. audible signal at the remote station RS1. Thus, a signal is provided at the remote station RS1 similar to that provided at the nurse station NS1 to indicate audibly the initiation of a patient-to-nurse call.

CANCELLATION OF CALL BY PATIENT

Patient station PS1 on FIG. 3 is equipped with a nurse-call release key NCRK1. Key NCRK1 may be physically located beyond reach of the patient, if desired. Key NCRK1 is operated when a patient wishes to cancel a previously initiated patient-to-nurse call before the call is answered by the nurse. Momentary operation of key NCRK1 applies ground potential over lead 310 to the base of transistor 4T3. The application of ground potential to the base of transistor 4T3 removes the forward bias from its emitter-base junction and turns transistor 4T3 OFF. When transistor 4T3 is turned OFF, the locking circuit for relay 4NC is opened and relay 4NC is released. The release of relay 4NC removes the above-described 60 i.p.m. signaling potentials supplied through interrupter 530 from the various lamps PL1, DL1, SL1 and buzzers NB1, RB1 and releases relay 5ST to deactivate interrupter 530. Thus, the operation of nurse-call release key NCRK1 effectively cancels the patient-to-nurse call and returns the patient station control circuit of FIG. 4 and the control circuits of FIG. 5 to their respective conditions.

NURSE ANSWER

In response to the above-described audible and visual nurse-call signals indicating the initiation of a patient-to-nurse call from the patient station PS1, the nurse at nurse station NS1 answers the call by lifting the nurse station handset NHS1, operating the intercom pick-up key IPK1 and momentarily operating the station selection key SSK1 discretely associated with the flashing station lamp SL1. When the nurse picks up the nurse station handset NHS1, ground potential is applied through the switchhook contact (not shown) of nurse station NS1 to lead 224. Intercom pick-up key IPK1 is a locking type key which remains operated until manually released. When key IPK1 is operated, the ground on lead 224 is applied through key IPK1 to lead 203, and over lead 203 through the winding of relay 5N1 to negative potential. Relay 5N1 is operated over this circuit.

When relay 5N1 operates, negative potential is applied through make contact 5N1–1 to lead 519, which is connected to the winding of relay 5WT and is also connected through resistors 5R6 and 5R2 to the base of transistor 5T1. The emitter of transistor 5T1 is connected through varistor 5V1 to ground potential. Therefore, the application of negative potential over lead 519 to the base of transistor 5T1 forward biases the emitter-base junction of transistor 5T1 causing transistor 5T1 to be turned ON. When transistor 5T1 is turned ON, a circuit is completed for operating relay 5WT, extending from the negative potential on lead 519 through the winding of relay 5WT, transistor 5T1 and varistor 5V1 to ground potential.

Tone source 5TS may comprise any well-known type of oscillator or signal generator. When relay 5WT is not operated, the output of tone source 5TS is applied over lead 517 and through break contact 5WT–1 directly to ground potential. When relay 5WT is operated, the output of tone source 5TS is applied through make contact 5WT–1 to lead 516, which is connected to the tip conductor 207 of the nurse intercommunication channel NIC.

The aforedescribed operation of intercom pick-up key IPK1 connected the handset NHS1 of nurse station NS1 over tip and ring leads 222 and 223 through the operated key IPK1 to the nurse intercommunication channel NIC comprising tip and ring leads 206 and 207. The tone supplied by tone source 5TS is transmitted over nurse intercommunication channel NIC to the handset NHS1 of nurse station NS1. This tone audibly indicates to the nurse that she is connected to the intercommunication system and may proceed to select a patient station for communication therewith.

The operation of relay 5N1 also completes a circuit for lighting intercom lamp IL1 at nurse station NS1. Continuous alternating potential LB is applied through make contact 5N1–3 and over lead 204 to intercom lamp IL1. The lighting of intercom lamp IL1 visually indicates to the nurse that she is connected to the intercommunication system.

When relay 5N1 operates, an operating circuit for relay 5N2 is completed. Negative potential is applied through make contact 5N1–1, resistor 5R1 and diode 5D1 to the base of transistor 5T2. Ground potential is applied through varistor 5V2 to the emitter of transistor 5T2. The emitter-base junction of transistor 5T2 is thus forward biased, and transistor 5T2 is turned ON. When transistor 5T2 turns ON, relay 5N2 operates over a circuit extending from negative potential through make contact 5N1–1, the winding of relay 5N2, transistor 5T2 and varistor 5V2 to ground potential.

The nurse now selects the calling patient station PS1 by momentarily operating the station selection key SSK1 discretely associated with the flashing station lamp SL1. When key SSK1 is operated, ground potential is applied to lead 401. An operating circuit is thereby completed for relay 5S on FIG. 5. This circuit extends from negative potential through make contact 5N2–3, the winding of relay 5S and diode 5D2, over lead 505, through diode 4D2, over lead 401 and through operated key SSK1 to ground potential. Relay 5S is locked operated through its own make contact 5S1–1.

Capacitor 5C1 is normally charged over a circuit extending from ground potential through resistor 5R3, capacitor 5C1, resistor 5R4 and resistor 5R5 to negative potential. When ground potential is applied to lead 401 through operated key SSK1, capacitor 5C11 starts to discharge over a circuit extending from capacitor 5C1 through resistor 5R4, over lead 505 and through diode 4D2 to the ground potential on lead 401. As capacitor 5C1 is thus being discharged, current is drawn from negative potential through make contact 5N1–1, resistor 5R1 and zener diode 5D1. When the voltage drop across resistor 5R1 becomes sufficiently large, the voltage applied to zener diode 5D1 becomes less than the voltage threshold of zener diode 5D1. At this time the base of transistor 5T2 is effectively at ground potential, and transistor 5T2 is turned OFF. Zener diode 5D1 reduces the time required to turn transistor 5T2 OFF by blocking the application of negative potential to the base of transistor 5T2.

When transistor 5T2 is turned OFF, the operating circuit for relay 5N2 is opened and relay 5N2 releases. The release of relay 5N2 opens the operating and locking circuits for all –P1 relays at make contact 5N2–4. Thus any —P1 relays, such as 4P1, 7P1 and 8P1 in the patient station control circuits of FIGS. 4, 7 and 8, which were previously operated due to previous nurse-patient connections, will be released when relay 5N2 is released.

When capacitor 5C1 is sufficiently discharged and the voltage drop across resistor 5R1 is thus lowered, the voltage applied to zener diode 5D1 will again exceed its breakdown threshold. At this time, negative potential is again applied to the base of transistor 5T2 and transistor 5T2 is turned ON. The RC time constant of capacitor 5C1 and resistor 5R4 determine the time interval during which transistor 5T2 is turned OFF.

The return of transistor 5T2 to its ON condition causes relay 5N2 to reoperate over its above-described operating circuit. Operation of relay 5N2 completes an operating circuit for relay 4P1. This circuit extends from negative potential through make contact 5N2–4, over lead 504, through the winding of relay 4P1 and diode 4D1, over lead 401 and through operated key SSK1 to ground potential. Although this operating circuit was previously completed by the momentary operation of relay 5N2, it was opened when transistor 5T2 was momentarily turned OFF before relay 4P1 could operate. Relay 4P1 is held operated over a circuit extending from negative potential through make contact 5N2–4, over lead 504, and through the winding of relay 4P1, make contact 4P1–1 and break contact 4P2–1 to ground potential. Since the operating circuits for other –P1 relays include other operated station selection keys SSK30, SSK60 and these keys SSK30, SSK60 are not operated, only relay 4P1 will operate when relay 5N2 operates.

This momentary release of relay 5N2 when a station selection key SSK1 is operated permits the nurse sequentially to select patient stations PS1–PS60 by momentarily operating various station selection keys SSK1–SSK60 without replacing the nurse station handset NHS1 or releasing the intercom pick-up key IPK1. Each time a station selection key SSK1–SSK60 is momentarily operated, the previously operated –P1 relays of all patient station control circuits are released, and the –P1 relay of the patient station circuit associated with the operated station selection key SSK1–SSK60 is then operated.

When relay 4P1 operates, the tip and ring conductors 206 and 207 of the nurse intercommunication channel NIC are connected to the patient intercommunication channel PIC1. The connecting circuit extends from the nurse handset NHS1 of FIG. 2 over conductors 222 and 223, through operated key IPK1, over conductors 206 and 207, through control unit 5VSCU, over conductors 512, 513, 514 and 515, through make contacts 4P1–6, 4P1–5, 4P1–4 and 4P1–3, over conductors 312, 313, 314 and 315, through the amplifier 3A1 at patient station PS1 and over conductors 316, 317, 318 and 319 to the microphone M1 and speaker S1 at the patient station PS1. When this intercommunication connection is established, the tone supplied by tone source 5TS is transmitted through control unit 5VSCU and over the patient intercommunication channel PIC1 to the patient station PS1. This tone, which is broadcast over speaker S1 at the patient station PS1, is heard by the patient and serves as a signal audibly indicating that the nurse has connected to his intercommunications channel PIC1.

The above-described operation of relay 5S completed a circuit for operating relay 5X. This circuit extends from negative potential through make contact 5N1–1 over lead 519 through the winding of relay 5X and through make contacts 5N2–2 and 5S–4 to ground potential. Relay 5X, in operating, applies ground potential to the base of transistor 5T1 through make contact 5X–2 and resistor 5R2. Capacitor 5C2 is then discharged through resistor 5R2 and make contact 5X–2 to ground potential. The RC time constant of capacitor 5C2 and resistor 5R2 determine the time required for capacitor 5C2 to discharge. This time is approximately one-half second. When capacitor 5C2 is sufficiently discharged, the potential applied to the base of transistor 5T1 is lowered sufficiently to remove the forward bias from the emitter-base junction and turn transistor 5T1 OFF.

When transistor 5T1 is turned OFF, approximately one-half second after the operation of relay 5X, ground potential is removed from the winding of relay 5WT and relay 5WT releases. The release of relay 5WT removes the output of tone source 5TS from the tip conductor 207 of the nurse intercommunication channel NIC, thereby removing the audible tone signal from nurse intercommunication channel NIC and patient intercommunication channel PIC1.

When relay 4P1 was operated, as described above, the locking circuit for relay 4NC was opened at break contact 4P1–1, and relay 4NC then released. The release of relay 4NC extinguishes the various audible and visual nurse-call signals which were provided, as previously described, to alert the nurse to a patient-to-nurse call. The operation of relay 4P1 initiates different visual signals which indicate the answering of the patient-to-nurse call and the busy state of the intercommunication channels NIC and PIC1 used for the patient-to-nurse call. Lead 503 is disconnected from lead 217 at make contact 4NC–4, thereby removing the 60 i.p.m. alternating potential BB from lead 217 and silencing buzzer NB1. Continuous alternating potential LB is applied through break contact 4E–2 and make contact 4P1–2 to leads 311 and 411 causing patient lamp PL1 at patient station PS1 and station lamp SL1 at nurse station NS1 to light steadily. The 60 i.p.m. alternating potential LB previously applied over lead 506 is disconnected from leads 311 and 411 at break contact 4P1–2 upon the operation of relay 4P1. The condition of patient lamp PL1 and station lamp SL1 is thus changed from a flashing to a steady light.

The emitter of transistor 4T2 is connected through varistor 4V1 to ground potential. Prior to operation of relay 4P1, the base of transistor 4T2 is also connected to ground potential through diode 4D4, break contact 4P1–1 and break contact 4P2–1. However, when relay 4P1 operates, ground potential is removed from base of transistor 4T1 at break contact 4P1–1. Negative potential applied to the base of transistor 4T2 through resistor 4R2 then forward biases the emitter-base junction of transistor 4T2, causing transistor 4T2 to turn ON. When transistor 4T2 is turned ON, continuous ground potential is applied to the base of transistor 4T4 over a circuit including varistor 4V1, transistor 4T2, resistor 4R4, break contact 4NC–1 and break contact 4E–6. Transistor 4T4 is thus turned ON continuously, and supplies continuous negative potential to lead 302 thereby causing door lamp DL1 to be lighted continuously.

As previously described, the momentary operation of key SSK1 at nurse station NS1 applies ground potential to lead 401. The ground potential on lead 401 is applied through diode 4D1 and resistor 4R3 to the base of transistor 4T1. The emitter of transistor 4T1 has negative potential applied thereto through make contact 5N2–4 and over lead 504. The base-emitter junction of transistor 4T1 is thus forward biased and transistor 4T1 is turned ON.

When transistor 4T1 is turned ON, a circuit is completed for the operation of relay 4P2. This circuit extends from negative potential through make contact 5N2–4, over lead 504, through transistor 4T1, the winding of relay 4P2 and diode 4D3, over lead 308, through data jack DJ1 and the nonoperated switchhook SH1 of patient station PS1 to ground potential. The operation of relay 4P2 transfers the locking path of relay 4P1, as described above, to a different locking path extending from negative potential on lead 504 through the winding of relay 4P1 and make contact 4P2–6 and over lead 308 to ground potential, through the nonoperated switchhook SH1.

When relay 4P2 operates, transistor 4T1 is turned OFF by the shunting action of make contact 4P2–2. However, relay 4P2 remains operated over a locking circuit extending from negative potential on lead 504 through make contact 4P2–2, the winding of relay 4P2 and make contact 4P2–1 to ground potential.

The patient and the nurse can now communicate by way of the connected nurse intercommunication channel NIC and patient intercommunication channel PIC1. The patient communicates hands-free, i.e. without use of the patient station handset PHS1, by way of microphone M1 and speaker S1. The nurse communicates by way of the nurse station handset NHS1. If desired, the nurse station NS1 may be equipped with a separate speakerphone arrangement permitting the nurse to communicate hands-free.

PRIVATE NURSE-PATIENT INTERCOMMUNICATION

When an intercommunication connection is established between nurse intercommunication channel NIC and patient intercommunication channel PIC1, as described above, the conversation between the nurse and the patient may be heard throughout the room 100 in which patient station PS1 is located. The nurse's voice is broadcast over speaker S1 and the patient's voice is picked up through microphone M1. Since nurse-patient conversations may be highly personal to the patient or since other patients in the same room might be disturbed, provision is advantageously provided at patient station PS1 for initiating a transfer of the nurse-patient conversation from the patient intercommunication channel PIC1 to the patient telephone channel PTC1 associated with the patient station handset PHS1. When this transfer is accomplished, the nurse-patient conversation is no longer broadcast from speaker S1 and may be privately carried on by way of the patient station handset PHS1.

When relay 4P2 was operated, as previously described, the patient telephone channel PTC1 comprising leads 306 and 307 was connected through make contacts 4P2–5 and 4P2–4 to the nurse intercommunication channel NIC comprising leads 206 and 207. Since the switchhook SH1 at patient station PS1 was not operated at this time handset PHS1 was not connected to ring lead 307 and the connection of the patient telephone channel PTC1 to the nurse intercommunication channel NIC merely prepared the patient station control circuit of FIG. 4 for a possible subsequent transfer operation.

When the patient at patient station PS1 desires to communicate privately with the nurse at nurse station NS1, he merely picks up the patient station handset PHS1 thereby operating switchhook SH1. The operation of switchhook SH1 removes ground potential from lead 308. As previously described, relay 4P1 is held operated over a locking circuit extending from its winding through make contact 4P2–6 to ground potential on lead 308. The removal of ground potential from lead 308 causes relay 4P1 to release. When relay 4P1 releases, the connection of the nurse intercommunication channel NIC to the patient intercommunication channel PIC1 is opened at make contacts 4P1–6, 4P1–5, 4P1–4 and 4P1–3.

The operation of switchhook SH1 completes the connection of the patient station handset PHS1 to the patient telephone channel PTC1 comprising tip and ring leads 306 and 307. Tip and ring conductors 306 and 307 of patient telephone channel PTC1 are normally connected through break contacts 4P2–5 and 4P2–4 to tip and ring conductors 304 and 305 and thence to telephone exchange 104, permitting patient station PS1 to originate and receive outside calls through handset PHS1. However, when relay 4P2 is operated, as previously described, the patient telephone channel PTC1 is disconnected from telephone exchange 104 at break contacts 4P2–5 and 4P2–4. Therefore, when patient telephone channel PTC1 is connected to nurse intercommunication channel NIC, as described above, the patient may converse privately with his nurse.

When relay 4P1 releases, alternating potential LB is still applied to leads 311 and 442 through make contact 4P2–3 to maintain lamps LP1 and SL1 in a continuously lighted condition.

If the patient at patient station PS1 had been using patient telephone channel PTC1 for an outside call at the time the patient-to-nurse call was initiated and answered, ground potential would not have been applied through switchhook SH1 to lead 308. Therefore relay 4P2 would not have been operated and the preparatory connection between the patient telephone channel PTC1 and the nurse intercommunication channel NIC would not have been made. The patient would then be able to converse with the nurse over patient intercommunication channel PIC1 and carry on his outside call conversation over patient telephone channel PTC1 at the same time. In this circumstance, should the patient wish to converse privately with the nurse, he must first terminate his outside call. The patient may momentarily operate his switchhook SH1 thereby applying ground potential to lead 308. This momentary application of ground potential to lead 308 completes an operating circuit for relay 4P2, as previously described. Relay 4P2 locks in an operated condition, as described above, connects patient telephone channel PTC1 to nurse intercommunication channel NIC, as described above, and disconnects patient telephone channel PTC1 from telephone exchange 104, as described above. When the patient again releases switchhook SH1 at patient station PS1, ground potential is again removed from lead 308 and relay 4P1 is released, as previously described. The release of relay 4P1 disconnects nurse intercommunication channel NIC from patient intercommunication channel PIC1, as described above. Thus, by merely flashing the switchhook SH1 at his station PS1 a patient may disconnect from an outside call currently in progress over his telephone channel PTC1 and transfer a patient-nurse conversation from his intercommunication channel PIC1 to his telephone channel PTC1.

Should a patient wish to return the nurse-patient conversation to his intercommunication channel PIC1 he can replace his handset PHS1 and thereby effect a transfer of the nurse-patient conversation from his telephone channel PTC1 to his intercommunication channel PIC1. When the patient handset PHS1 is replaced, ground potential is again applied to lead 308. An operating circuit for relay 4P1 is thereby completed extending from negative potential through make contact 5N2–4, over lead 504, through the winding of relay 4P1 and through make contact 4P2–6 to ground potential on lead 308. The operation of relay 4P1 connects patient intercommunication channel PIC1 to nurse intercommunication channel NIC through make contacts 4P1–6, 4P1–5, 4P1–4 and 4P1–3, as previously described.

DISCONNECTION

The termination of a nurse-to-patient intercommunication connection is under the complete control of the nurse. Although the patient may control the privacy of the nurse-patient conversation, he cannot effect a disconnection from the nurse station NS1. The nurse at nurse station NS1 can terminate a nurse-patient call in any of three ways.

If the nurse replaces the nurse station handset NHS1, ground potential is removed from leads 224 and 203. The removal of ground potential from lead 203 opens the operating circuit of relay 5N1, as described above, and relay 5N1 is released. The release of relay 5N1 initiates the release of relay 5X by removing negative potential from lead 519 at make contact 5N1–1. When relay 5N1 releases, relay 5N2 is released by the opening of make contact 5N1–1. When relay 5N2 is released, negative potential is removed from the winding of relay 5S by opening make contact 5N2–3 and relay 5S is released. The release of relay 5N2 removes negative potential from lead 504 by opening make contact 5N2–4. The removal of negative potential from lead 504 causes relays 4P1 and 4P2 to release, thereby returning the patient station control circuit of FIG. 4 to its normal condition.

The release of relays 4P1 and 4P2 extinguishes lamps LP1, SL1 and DL1. Alternating potential LB is removed from leads 311 and 411 at make contact 4P1–2 or make contact 4P2–3 when both of these relays are released. Patient lamp PL1 and station lamp SL1 are thus extinguished. The release of relay 4P1 returns ground potential through break contacts 4P1–1 and 4P2–2 to the base of transistor 4T2. Transistor 4T2 is thereby turned OFF and ground potential is removed from the base of transistor 4T4. The removal of ground potential from the base of transistor 4T4 causes it to be turned OFF. Negative potential is thus removed from lead 302 causing relay DLC1 to release and door lamp DL1 to be extinguished. Thus the replacement of nurse handset NHS1 effects a disconnection of nurse intercommunication channel NIC from patient intercommunication channel PIC1 and the return of the patient station control circuit of FIG. 4 and the nurse station control circuit of FIG. 5 to a normal condition.

The nurse may also terminate a nurse-patient call by releasing intercom pick-up IPK1. The release of key IPK1 removes ground potential from lead 203 and initiates the same circuit operation described above for returning the control circuits of FIGS. 4 and 5 to a normal condition.

As previously described, the nurse may select another calling patient station, for example, patient station PS30, without replacing her handset NHS1 or releasing key IPK1. To select patient station PS30 for intercommunication therewith, the nurse momentarily operates key SSK30. Ground potential is then applied to conductor 701. This ground potential is extended through diode 7D2 to lead 505 on FIG. 7. As previously described, the momentary application of ground potential to lead 505 causes capacitor 5C1 to discharge, resulting in the permanent release of all P1 relays except that of the patient station control circuit associated with the selected patient station. Thus, the patient station control circuit of FIG. 4 is returned to its normal condition responsive to the momentary operation of key SSK30, and the nurse is connected to patient intercommunication channel PIC30 in the same manner as previously described with reference to the connection of the nurse-patient intercommunication channel PIC1.

ANSWER FROM REMOTE STATION

The occasion may arise when it is necessary that nurse station NS1 be left unattended. Remote station RS1 is provided to permit answering of patient-to-nurse calls at a location other than nurse station NS1. Remote station RS1 may be located in any convenient, normally attended area of the hopsital.

The remote station transfer key RTK1 at nurse station NS1 is manually operated by the nurse whenever nurse station NS1 is to be left unattended. Key RTK1, when operated, will remain so until manually released. The operation of key RTK1 connects ground potential over lead 225 to buzzer RB1 at remote station RS1. Lead 217, over which alternating potential BB is supplied to activate buzzer NB1 at nurse station NS1, is connected via lead 237 to buzzer RB1 at remote station RS1. Thus, when key RTK1 is operated, buzzer RB1 is activated concurrently with buzzer NB1.

Tip lead 232 of nurse telephone channel NTC1 is connected through operated key RTK1 to lead 220 and thence to the ringer (not shown) in remote station RS1. Ring lead 233 of nurse telephone channel NTC1 is connected through operated key RTK1 to lead 219 and thence to the ringer in remote station RS1. Thus, incoming calls over telephone channel NTC1 which activate ringer NR1 at nurse station NC1 also activates the ringer of nurse station RS1 when key RTK1 is operated.

As previously described, the operation by a patient of a nurse-call key NCK1–NCK60 initiates generation of a 60 i.p.m. audible nurse-call signal by buzzers NB1 and RB1. In response to this audible signal, the attendant at remote station RS1 may automatically answer a calling patient station PS1–PS60 merely by lifting the handset RHS1 of remote station RS1. When handset RHS1 is lifted, ground potential is applied through the operated switchhook (not shown) of remote station RS1 to lead 218, thereby operating relay 5SC.

An operating circuit for relay 5N1 is completed through make contact 5SC–1 when relay 5SC operates. The operation of relay 5N1 turns transistor 5T2 ON and completes an operating circuit for relay 5N2 through transistor 5T2, as previously described.

Assuming that patient station PS1 initiated the patient-to-nurse call, relay 4NC has been operated already, as previously described. The operation of relay 5N2 therefore completes an operating circuit for relay 4P1. This circuit extends from negative potential through make contact 5N2–4, over lead 504, through the winding of relay 4P1 and diode 4D1, over lead 401 and lead 421, through make contact 4NC–6, over lead 501 and through break contact 5X–1 and make contact 5SC–2 to ground potential.

Transfer contacts of all nurse-call relays, for example 4NC–6 and 8NC–6, are arranged along lead 402 in a preference lockout type chain circuit. For example, if patient station PS30 had initiated the patient-to-nurse call, relay 4NC would not be operated and relay 7NC would be operated instead. The ground potential applied to lead 501 through make contact 5SC–2 would then extend over lead 402 through break contact 4NC–6 and make contact 7NC–6 to lead 701, thereby providing an operating circuit for relay 7P1. The preference chain circuit along leads 402 and 702 comprising transfer contacts 4NC–6—8NC–6 of the various nurse-call relays 4NC–8NC determines the order in which calling patient stations PS1–PS60 are answered from remote station RS1. The order in which calls are answered may be rearranged by manipulation of the preference circuit in accordance with the preference to be given the various patient stations PS1–PS60.

The operation of relay 4P1 initiates circuit operations in the patient station control circuit of FIG. 4 and the nurse station control circuit of FIG. 5 identical to those previously described with reference to the answering by the nurse of a patient-to-nurse call at nurse station NS1. The handset RHS1 of remote station RS1 is associated with tip and ring leads 226 and 227 of remote intercommunication channel RIC. Leads 226 and 227 are connected to tip and ring leads 206 and 207 of nurse intercommunication channel NIC. As a result, the remote intercommunication channel RIC is connected via tip and ring leads 206 and 207, control unit 5VSCU, leads 512, 513, 514 and 515, and make contacts 4P1–6, 4P1–5, 4P1–4 and 4P1–3 to the patient intercommunication channel PIC1.

The operation of relay 5WT, tone source 5TS, relay 5S and relay 5X is identical to that previously described. However, when relay 5X is operated, the above-described operating circuit for relay 4P1 is opened at make contact 5X–1. The control of relay 4P1 is then transferred to the switchhook SH1 at patient station PS1 to permit the patient to select either the intercommunication channel PIC1 or the telephone channel PTC1 for conversing with the nurse at remote station RS1. The transfer operation between intercommunication channel PIC1 and telephone channel PTC1 is identical to that previously described.

When the nurse or attendant at remote station RS1 wishes to terminate his conversation with the calling patient he replaces the handset RHS1. Ground potential is thereby removed from lead 218 and relay 5SC is released. The release of relay 5SC causes the release of relay 5N1 by opening make contact 5SC–1. The remaining disconnect operations of the patient station control circuit of FIG. 4 and the nurse station control circuit of FIG. 5 are identical to those previously described.

If more than one patient station PS1–PS60 is calling the nurse, buzzer RB1 will continue to provide a 60 i.p.m. audible signal. Sixty i.p.m. alternating potential BB is applied through a make contact, such as 7NC–4, of the –NC relay associated with the other calling patient stations, such as PS30. The attendant at remote station RS1 can sequentially answer patient-to-nurse calls by flashing the switchhook of remote station RS1 to release an existing nurse-patient intercommunication connection and establish a connection to the next preferred patient station, such as PS30, as determined by the above-described preference lockout chain circuit of –NC relay transfer contacts. When all patient-to-nurse calls have been answered and therefore all –NC relays are released, the 60 i.p.m. audible signals from buzzer RB1 will cease.

EMERGENCY SIGNALING

Each patient room, such as private room 100 of FIG. 3 or ward 102 of FIG. 6, is equipped with an emergency key EK1–EK30. These keys are of the locking type and must be manually released. They may be located in appropriate areas at which a patient might require immediate attention, such as the washroom. The operation of an emergency key, such as EK1, initiates various audible and visual signals differing from those initiated by a normal patient-to-nurse call. The emergency audible and visual signals take preference over the patient-to-nurse-call signals and continue until the operated emergency key EK1–EK30 is manually released by the patient or the nurse.

For purposes of description it will be assumed that patient station PS60 has initiated a normal patient-to-nurse call, that patient station PS30 is presently connected to nurse station NS1 and that another patient in ward 102 now operates emergency key EK30.

Responsive to the operation of key NCK60, relay 8NC has been operated and the 60 i.p.m. control signals from interrupter 530 have been applied, as previously described, through make contact 8NC–4 to lead 217, causing buzzer NB1 at nurse station NS1 to generate a 60 i.p.m. audible signal, and through make contact 8NC–1 to the base of transistor 8T4, causing door lamp DL30 to flash at 60 i.p.m. Negative potential has been applied through make contact 8NC–5 to terminal 816.

Terminal 816 is cross connected over a cross connection 710 to all corresponding terminals, such as 716, in patient station control circuits associated with other patient stations such as PS30 in the same room 102. The negative potential applied to terminal 816 is extended over cross connection 710 to terminal 716, through diode 7D5, break contact 7NC–1 and break contact 7E6 to the base of the transistor 7T4. In a similar manner negative potential is applied to the base elements of corresponding transistors in the patient station control circuits of other patient stations (not shown) located in the same room 102. Since the nurse is already in communication with another patient station PS30 in the same room 102, transistor 7T4 is continuously turned ON, as previously described, to cause door lamp DL30 to be continuously lighted. The above-described application of negative potential to the base of transisor 7T4 back biases the base-emitter junction thereof and turns transistor 7T4 OFF, thus removing the continuous negative potential from lead 602 and permitting the 60 i.m.p. negative potential supplied through transistor 8T4 to lead 602 to operate and release relay DLC30 at a 60 i.p.m. rate. Thus the 60 i.p.m. flashing door lamp signal, indicating a patient-to-nurse call, takes precedence over the continuous door lamp signal, indicating an existing connection between a patient and a nurse.

When key EK30 in ward 102 is operated, ground potential is applied to lead 601. An operating circuit for relay 7E, extending from negative potential through the winding of relay 7E, over lead 601 and through operated key EK30 to ground potential is thereby completed.

The operation of relay 7E applies continuous alternating potential BB through make contact 7E–4 to lead 217. Regardless of what other signals are applied to lead 217, the application of continuous alternating potential BB thereto causes buzzer NB1 to generate a continuous audible signal indicating an emergency call.

The operation of relay 7E connects the 120 i.p.m. alternating potential LB present on lead 509 through make contact 7E–3 to conductor 711, which, in turn, is connected to conductor 611. The continuous alternating potential LB already present on leads 611 and 711 as a result of the intercommunication call in progress between patient station PS30 and nurse station NS1 is disconnected at break contact 7E–2 when relay 7E operates. Patient lamp PL30 and station lamp SL30 therefore are flashed at 120 i.p.m. to visually indicate an emergency call.

The operation of relay 7E causes negative potential to be applied to the base elements of all other –T4 transistors of patient station control circuits such as FIG. 8 associated with patient stations such as PS60 in the same room 102. For example, negative potential is applied through make contact 7E–5 to terminal 715, over cross connection 709 to terminal 815, and through diode 8D8 and break contact 8E6 to the base of transistor 8T4. Transistor 8T4 is thereby back biased and maintained in its OFF condition permitting the emergency signals to take precedence over any other signals.

The operation of relay 7E connects the 120 i.p.m. ground potential on lead 507 through resistor 7R6 and make contact 7E–6 to the base of transistor 7T4. Any other potentials applied to the base of transistor 7T4 are disconnected at break contact 7E–6 when relay 7E is operated. Transistor 7T4 is turned ON and OFF at a 120 i.p.m. rate in response to the 120 i.p.m. ground potential applied to its base. Negative potential is then applied through varistor 7V3 and transistor 7T4, over lead 602 and through the winding of relay DLC30 to ground potential. Relay DLC30 is thereby operated and released at a 120 i.p.m. rate thereby causing door lamp DL30 to flash at a 120 i.p.m. rate. The rapid flashing of door lamp DL30 visually indicates an emergency call from the patient's room or ward 102 associated therewith.

Thus the operation of an emergency key, such as EK30, initiates the flashing of a station lamp SL30 at nurse station NS1, a patient lamp at patient station PS30 and door lamp DL30 at a 120 i.p.m. rate, and initiates the generation of a continuous audible signal by buzzer NB1 at nurse station NS1. All emergency signals take precedence over any normal patient-to-nurse signals or busy channel signals. Although the nurse can communicate with the patient station PS30 from which an emergency signal is initiated by operating the appropriate station selection key SSK30, the emergency signals cannot be released without the manual release of the emergency key EK30 in the patient's room or ward 102.

NURSE-TO-PATIENT CALL

When a nurse at nurse station NS1 wishes to communicate with a patient, she momentarily operates the station selection key SSK1–SSK60 discretely associated with the patient station PS1–PS60 with which she wishes to communicate. The resulting circuit operations are identical to those previously described with reference to the answering by the nurse of a patient-to-nurse call.

An audible signal supplied by tone source 5TS is transmitted to nurse handset NHS1 when handset NHS1 is lifted and key IPK1 is operated. A short burst of the same audible signal is transmitted to the selected patient over his intercommunication channel, for example PIC1, when the nurse momentarily operates the appropriate station selection key SSK1. Lamps DL1, SL1, LP1 and IL1 are continuously lighted until the nurse terminates the call, as previously described. The called patient may selectively transfer the ensuing nurse-patient conversation from his intercommunication channel PIC1 to his telephone channel PTC1, as previously described.

ROOM PRIVACY

If the conversation in the patient's room 100 is private in nature, or if for some other reason the patient does not wish to be disturbed, he can, by operating his privacy key PK1, preclude the nurse from eavesdropping by way of microphone M1 and cause an audible signal to be returned to the nurse indicating his desire to be left undisturbed. However, the nurse at her discretion can still talk to the patient through speaker S1 if it is felt necessary to disturb the patient.

The operation of privacy key PK1 disconnects the microphone M1 from lead 316 of the microphone circuit, thereby precluding transmission of any conversation to the nurse over the intercommunication channel PIC1. The operation of key PK1 also connects lead 311 through capacitors PC1 and PC2 to lead 316. In the event of a nurse-to-patient call, continuous alternating potential LB is applied to lead 311, as previously described. When the continuous alternating potential LB on lead 311 is applied through operated key PK1 to lead 316 of the microphone circuit, an audible signal is applied to the intercommunication channel PIC1. This audible signal is heard at nurse station NS1 and indicates to the nurse that the called patient does not wish to be disturbed.

*Outside calls*

PATIENT CALLS

Telephone exchange 104 may comprise any well-known manual or automatic switching center through which calls are completed to stations not within the intercommunication network, as previously described. Each patient station PS1–PS60 is equipped with a telephone channel PTC1–PTC60 which is normally terminated in telephone exchange 104. For example, telephone channel PTC1 of patient station PS1 includes tip and ring leads 306 and 307 which are connected through break contacts 4P2–5 and 4P2–4 to leads 304 and 305. Leads 304 and 305 are terminated in telephone exchange 104 and are also connected to the ringer PR1 of patient station PS1. Ringing signals from telephone exchange 104 which are transmitted over conductors 304 and 305 initiate the generation of an audible signal by ringer PR1 regardless of the operative condition of relay 4P2. Thus, whether or not the patient telephone channel PTC1 is in use for nurse-patient intercommunication, an incoming call signal from telephone exchange 104 will produce an audible signal from ringer PR1. As previously described, relay 4P2 is not operated unless a nurse-to-patient connection has been established. Therefore, break contacts 4P2–5 and 4P2–4 are normally closed and the patient as patient station PS1 can originate and receive outside calls using the handset PHS1.

An occasion may arise when a patient cannot be reached due to his absence from the room. If telephone exchange 104 is of the manual type, the operator may light a message-waiting lamp, such as MWL1 at patient station PS1, to indicate that she has a message for him. For example, potential may be applied to lead 303 at telephone exchange 104 causing lamp MWL1 at patient station PS1 to be lighted.

As previously described, should a patient already be engaged in an outside call over his telephone channel when the nurse initiates a nurse-to-patient call or when the patient initiates a patient-to-nurse call, both call conversations may be carried on at the same time. However, the patient must terminate his outside call before the nurse-patient conversation can be transferred to his telephone channel.

NURSE CALLS

A nurse station, such as NS1, is equipped with one or more telephone channels, such as NTC1. Each telephone channel NTC1 is discretely associated with a line pick-up key, such as LPK1. If it is desired to equip a nurse station NS1 with more than one telephone channel, telephone exchange 104 may include additional key telephone equipment, as is well known in the art, to permit the various switching functions required for multiple line station pickup. The nurse can originate and receive outside calls through any of her telephone channels, such as NTC1, by operating the appropriate line pick-up key LPK1 and lifting her handset NHS1. The nurse station NS1 may be further equipped with a hold button (not shown) permitting the nurse to hold outside calls while she answers calls from her patients.

If desired, remote station RS1 may be equipped with pick-up keys RLPK1, RIPK1 similar to intercom pick-up key IPK1 and line pick-up key LPK1 if desired. The tip and ring conductors, such as 228 and 229, of the nurse telephone channels, such as NTC1, are then multipled at the appropriate pick-up keys RLPK1 at remote station RS1. It is to be understood that the above-described arrangements are illustrative of the application of the principles of my invention. Numerous other arrangements may be devised by those skilled in the art, without departing from the spirit and scope of my invention.

What is claimed is:

1. In a telephone system,
a pair of stations,
a pair of distinct and separate bidirectional voice intercommunication channels extending between said stations,
means for interconnecting said stations via one of said channels to permit voice communication between said stations over said one channel,
and means at one of said stations for transferring said interconnection from said one channel to the other one of said channels to permit voice communication between said stations over said other channel.

2. In a telephone system,
the combination according to claim 1 wherein the other one of said stations comprises a telephone handset and a switchhook, said transfer means being activated upon removal of said handset from said switchhook.

3. A telephone system comprising
a first station,
a second station,
a telephone line discrete to said first station and extending from said first station,
switch means at said first station,
a telephone exchange for connecting said first station via said discrete telephone line to other telephone lines under control of said first station,
an intercommunication voice channel discrete to said first station and separate from said telephone line for connecting said first station to said second station to permit voice communication between said first and second stations,
and transfer means remote from said first station and responsive to operation of said switch means when a connection is established between said stations via said intercommunication channel for releasing said connection and for establishing a telephone connection between said stations via said telephone line to permit telephone communication between said first and second stations.

4. A telephone system in accordance with claim 3 wherein said transfer means comprises
first control means discrete to said first station,
means controlled by said first control means for connecting said intercommunication channel to said second station when said first control means is operated,
second control means discrete to said first station,
means controlled by said second control means for connecting said telephone line to said second station and disconnecting said subscriber line from said telephone exchange when said second control means is operated,
means controlled by said first control means and said switch means for operating said second control means when said first control means is operated and said switch means is released,
and means controlled by said second control means and said switch means for releasing said first control means when said second control means and said switch means are operated.

5. A telephone system in accordance with claim 3 wherein said transfer means comprises
first control means discrete to said first station,
means controlled by said first control means for connecting said intercommunication channel to said second station when said first control means is operated,
second control means discrete to said first station,
means controlled by said second control means for connecting said telephone line to said second station and disconnecting said telephone line from said telephone exchange when said second control means is operated;
and further comprising
means at said second station operable for selecting said first station,
means controlled by said switch means and responsive to operation of said station selection means for operating both said first and second control means when said switch means is released and for operating only said first control means when said switch means is operated,
means controlled by the operation of only said first control means and responsive to release of said switch means for operating said second control means,
and means controlled by the operation of said second control means and responsive to operation of said switch means for releasing said first control means.

6. A telephone system in accordance with claim 3 wherein said transfer means comprises
a first relay discretely associated with said first station;
make contacts controlled by said first relay for connecting said intercommunication channel to said second station;
a second relay discretely associated with said first station;
make contacts controlled by said second relay for connecting said telephone line to said second station;
break contacts controlled by said second relay for connecting said telephone line to said exchange network;
means for operating said first relay;
a first locking circuit for said first relay including another make contact controlled by said first relay and another break contact controlled by said second relay;
an operating circuit for said second relay including a break contact controlled by said switch means, said other make contact controlled by said first relay and said other break contact controlled by said second relay;
a second locking circuit for said first relay including another make contact controlled by said second relay and said break contact controlled by said switch means;
and a locking circuit for said second relay including make contacts controlled by said second relay.

7. A telephone system in accordance with claim 6 wherein said operating circuit further includes
a transistor having emitter, collector and base electrodes, said emitter being connected to negative potential,
said collector being connected through the winding of said second relay and said break contact controlled by said switch means to ground potential,
and said base being connected through said other make contact controlled by said first relay and said other break contact controlled by said second relay to ground potential.

8. A telephone system comprising
a station,
a master station,
a telephone line,
means at said station for completing the circuit of said telephone line,
a telephone exchange for connecting said station via said telephone line to other telephone lines under control of said station,
an intercommunication channel,
first means for connecting said station to said master station via said channel to permit voice communication between said stations,
second means operable only when said first means is operated and said circuit completing means is released for disconnecting said telephone line from said telephone exchange and for connecting said telephone line to said master station,
and means responsive to operation of said circuit completing means only when said second means is operated for releasing said first means.

9. A telephone system in accordance with claim 8 further comprising
a microphone and a speaker at said station connected to said intercommunication channel,
a conductor,
means for applying a signal to one end of said conductor when said station is connected via said intercommunication channel to said master station,
and means at said station operable for disconnecting said microphone from said channel and connecting the opposite end of said conductor to said channel.

10. A telephone system in accordance with claim 8 wherein said intercommunication channel comprises
a microphone circuit terminated in a microphone at said station and a speaker circuit terminated in a speaker at said station;
and further comprising
a conductor discretely associated with said station,
means for applying a signal to one end of said conductor when said station is connected via said intercommunication channel to said master station,
and means at said station operable for disconnecting said microphone circuit from said microphone and connecting said microphone circuit to the other end of said conductor.

11. A telephone system in accordance with claim 8 further comprising
a microphone at said station connected to said intercommunication channel;
a speaker at said station connected to said intercommunication channel;
a signal device at said station,
means for applying energizing potential to said signal device when said station is connected via said channel to said master station,
and means at said station operable for disconnecting said microphone from said channel and connecting said last named means to said channel.

12. A telephone system comprising
a plurality of stations,
a master station,
means at said master station for selecting each of said stations,
first means discrete to one of said stations responsive to a first operation of said station selecting means for connecting said one station to said master station,
second means discrete to another of said stations responsive to a second operation of said station selecting means distinct from said first operation thereof for connecting said other station to said master station,
and control means responsive to said second operation of said station selecting means for releasing said first means immediately and for operating said second means after a predetermined time interval.

13. A telephone system in accordance with claim 12 wherein said control means comprises
a relay;
a transistor having emitter, collector and base electrodes;
an operating circuit for said relay serially including the emitter and collector of said transistor;
an operating circuit for said first means including a make contact controlled by said relay and a make contact controlled by said first operation of said station selection means;
an operating circuit for said second means including said make contact controlled by said relay and a make contact controlled by said second operation of said station selection means;
a locking circuit for said first means including said make contact controlled by said relay;
timing circuit means serially connected between the base of said transistor and said station selection means;
and said timing circuit means responsive to operation of said station selection means immediately to turn said transistor OFF and, after a predetermined time interval, to turn said transistor ON.

14. A telephone system comprising
a first station;
a master station;
a signal device associated with said first station;
a first station control circuit discretely associated with said first station comprising
a first transistor,
a first energizing circuit for said signal device serially including the emitter and collector of said first transistor,
first switch control means operable responsive to a call signal from said first station,
means controlled by said first switch control means for applying forward-biasing potential to the base of said first transistor at a first rate of interruption causing said signal device to be energized at said first rate of interruption,
a second transistor,
second switch control means operable responsive to a station selection signal from said master station,
means controlled by said second switch control means for connecting said first station to said master station when said second switch control means is operated, for applying forward-biasing potential to the base of said second transistor when said second switch control means is operated and for holding said first switch control means operated when said second switch control means is released,
means serially including the emitter and collector of said second transistor for applying continuous forward-biasing potential to the base of said first transistor causing said signal device to be energized continuously,
third switch control means operable responsive to an emergency signal from said first station,
and means controlled by said third switch control means for disconnecting both said continuous forward-biasing potential and said interrupted forward-biasing potential from the base of said first transistor and for applying forward-biasing potential thereto at a second rate of interruption causing said signal device to be energized at said second rate of interruption.

15. A telephone system in accordance with claim 14 further comprising
a second station having said signal device associated therewith;
a second station control circuit discretely associated with said second station and comprising
a third transistor,
a second energizing circuit for said signal device serially including the emitter and collector of said third transistor,
and means responsive to a station selection signal from said master station for applying continuous forward-biasing potential to the base of said third transistor;
and means controlled by said first switch control means in said first station control circuit for applying continuous back-biasing potential to the base of said third transistor in said second station control circuit causing said third transistor to be continuously turned OFF and said signal device to respond only to said first energizing circuit.

16. A telephone system in accordance with claim 15 wherein said second station control circuit further comprises
means responsive to a call signal from said second station for applying forward-biasing potential at said first rate of interruption to said base of said third transistor;
and further comprising
means controlled by said third switch control means in said first station control circuit for applying continuous back-biasing potential to said base of said third transistor in said second station control circuit causing it to be continuously turned OFF and said signal device to respond only to said first energizing circuit.

17. A telephone system comprising
a plurality of stations,
a master station,
a discrete telephone line extending from each station,
a telephone exchange for interconnecting said telephone lines under control of a calling station to permit communication over said interconnected telephone lines between said stations discrete thereto,
an intercommunication channel discrete to each of said stations for connecting each of said stations to said master station to permit bidirectional voice communication between said stations discrete thereto and said master station,
and means activated by one of said stations in communication via said discrete intercommunication channel with said master station for transferring the connection to said master station from said discrete channel to said discrete telephone line to permit telephone communication between said one station and said master station over said discrete telephone line.

18. An intercommunication telephone system comprising
a plurality of substations,
a master station,
means including an intercommunication voice channel unique to each of said substations for connecting said substations to said master station in a first manner,
means including a distinct telephone channel separate from said intercommunication channel for each of said substations for connecting said substations to said master station in a second manner,
and means for transferring the connection of said substations from said intercommunication channel to said telephone channel.

19. An intercommunication telephone system in accordance with claim 18 further comprising
a remote station,
means connecting said remote station to said master station and to said plurality of substations,
and means at said master station for transferring control from said master station to said remote station.

20. An intercommunication telephone system in accordance with claim 18 further comprising
means for establishing telephone connections to individual of said substations exclusive of said master station.

21. An intercommunication telephone system in accordance with claim 20 further comprising
means at each of said substations when said substation is connected to said telephone channel for seizing said last-mentioned means.

22. A telephone system comprising
a plurality of substations;
a master station;
first controllable switching means;
a voice transmitting communications channel discrete to each of said substations and connecting each of said substations to said first controllable switching means;
a voice receiving communications channel discrete to each of said substations connecting each of said substations to said first controllable switching means;
a first two-way communications channel discrete to each of said substations and connecting each of said substations to said first controllable switching means;
a second two-way communications channel connecting said master station to said first controllable switching means;
means at said master station for generating a station selection signal discretely defining each of said substations;
said first controllable switching means responsive to a station selection signal to connect said second two-way communications channel to the transmitting and receiving communications channels discrete to the substation defined by said station selection signal;
means at each of said substations for generating a channel transfer signal;
and said first controllable switching means responsive to a channel transfer signal generated by said defined substation to disconnect said second two-way channel from said transmitting and receiving channels and to connect said second two-way channel to said first two-way channel discrete to said defined substation.

23. A telephone system comprising
a plurality of substations;
a master station;
first switching means;
second switching means;
a first telephone channel discrete to each of said substations and connecting each of said substations to said first switching means;
a first bidirectional voice communications channel discrete to each of said substations physically separate from said first telephone channels and connecting each of said substations to said first switching means;
a second telephone channel corresponding to each said first telephone channel and connecting said first switching means to said second switching means;
a second bidirectional voice communications channel connecting said master station to said first switching means;
said first switching means normally operative to connect each of said first telephone channels to the corresponding one of said second telephone channels;
means at each of said substations for generating call information signals defining each of said substations;
said second switching means responsive to said call information signals for interconnecting selectively said second telephone channels in accordance with said call information signals;
means at said master station for generating selectively station selection signals discretely defining each of said substations;

said first switching means responsive to said station selection signals for connecting said second voice channel selectively to the first voice channel discrete to a defined substation;

means at each of said substations for generating a channel transfer signal;

and said first switching means responsive to a channel transfer signal generated at said defined substation to disconnect said first telephone channel discrete to said defined substation from said one corresponding second telephone channel, to disconnect said second voice channel from said first voice channel discrete to said defined substation and to connect said second voice channel to said first telephone channel discrete to said defined substation.

References Cited by the Examiner

UNITED STATES PATENTS

| | | | |
|---|---|---|---|
| 2,100,887 | 11/1937 | Varley | 179—1 |
| 2,722,566 | 11/1955 | Peterson | 179—18.04 |
| 2,764,632 | 9/1956 | Adler | 179—1.4 |
| 2,813,152 | 11/1957 | Blow | 179—1.4 |
| 2,885,477 | 5/1959 | Smith | 179—1 |
| 2,892,033 | 6/1959 | Corrigan | 179—1.4 |
| 2,896,021 | 7/1959 | Phillips | 179—1.4 |
| 3,150,238 | 6/1964 | Carter | 179—99 |
| 3,158,686 | 11/1964 | Liberman | 179—1.4 |
| 3,215,789 | 11/1965 | Hunter et al. | 179—170.6 |
| 3,239,610 | 3/1966 | Morse et al. | 179—42 |

KATHLEEN H. CLAFFY, *Primary Examiner.*

J. W. JOHNSON, H. ZELLER, *Assistant Examiners.*